(12) United States Patent
Zhao et al.

(10) Patent No.: US 8,796,409 B2
(45) Date of Patent: Aug. 5, 2014

(54) USE OF TEMPERATURE AND ETHYLENE PARTIAL PRESSURE TO INTRODUCE LONG CHAIN BRANCHING IN HIGH DENSITY POLYETHYLENE

(75) Inventors: Mosha H. Zhao, Houston, TX (US); Cesar A. Garcia-Franco, Houston, TX (US); Patrick Brant, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 13/252,469

(22) Filed: Oct. 4, 2011

(65) Prior Publication Data
US 2013/0085244 A1 Apr. 4, 2013

(51) Int. Cl.
| | |
|---|---|
| C08F 110/02 | (2006.01) |
| C08F 10/02 | (2006.01) |
| C08F 4/6592 | (2006.01) |
| C08F 210/02 | (2006.01) |

(52) U.S. Cl.
CPC ............. *C08F 10/02* (2013.01); *C08F 210/02* (2013.01); *C08F 4/6592* (2013.01)
USPC ............ 526/352; 526/160; 526/165; 526/348

(58) Field of Classification Search
CPC ....... C08F 110/02; C08F 10/02; C08F 4/6592
USPC ............ 526/160, 165, 348, 348.2, 348.5, 352
See application file for complete search history.

(56) References Cited

U.S. PATENT DOCUMENTS

| | | | |
|---|---|---|---|
| 5,514,634 A | 5/1996 | Hagerty et al. |
| 5,525,678 A | 6/1996 | Mink et al. |
| 5,693,583 A | 12/1997 | Hagerty et al. |
| 6,492,472 B2 | 12/2002 | Lue et al. |
| 7,041,617 B2 | 5/2006 | Jensen et al. |
| 7,148,298 B2 | 12/2006 | Jensen et al. |
| 7,470,758 B2 | 12/2008 | Jensen et al. |
| 7,576,163 B2 | 8/2009 | Yang et al. |
| 7,625,982 B2 | 12/2009 | Martin et al. |
| 2003/0195306 A1 | 10/2003 | Tsuie et al. |
| 2005/0020438 A1 | 1/2005 | Razavi |
| 2007/0232483 A1 | 10/2007 | Yang et al. |
| 2010/0222529 A1 | 9/2010 | Michel et al. |
| 2011/0059278 A1 | 3/2011 | Maziers |

FOREIGN PATENT DOCUMENTS

| | | |
|---|---|---|
| EP | 0 659 773 | 8/1998 |
| EP | 0 700 937 | 2/2000 |
| EP | 1 217 013 | 6/2002 |
| EP | 0 743 324 | 9/2002 |
| EP | 1 357 136 | 10/2003 |
| WO | WO 02/24769 | 3/2002 |
| WO | WO 03/022890 | 3/2003 |
| WO | WO 2006/004789 | 1/2006 |
| WO | WO 2009/114661 | 9/2009 |

OTHER PUBLICATIONS

Bergstra et al., "Ethylene Polymerization Kinetics with a Heterogeneous Metallocene Catalyst—Comparison of Gas and Slurry Phases", Macromolecular Materials and Engineering, 2005, vol. 209, No. 6, pp. 610-620.
Chambon et al., "Stopping of Crosslinking Reaction in a PDMS Polymer at the Gel Point", Polymer Bulletin, 1985, vol. 13, No. 6, pp. 499-503.
Combs et al., "Effects of Molecular Weight Distribution and Branching on Rheological Properties of Polyolefin Melts", Journal of Applied Polymer Science, 1969, vol. 13, No. 3, pp. 519-534.
Crowther, "Influence of Cyclopentadienyl Substituents in Zirconocenes on Long Chain Branching in PE", ACS Inorganometallic Workshop, 2000, Belmont, MD.
Garcia-Franco et al., "Similarities between Gelation and Long Chain Branching Viscoelastic Behavior", Macromolecules, 2001, vol. 34, No. 10, pp. 3115-3117.
Guillet et al., "Effects of Molecular Weight Distribution and Branching on Rheological Parameters of Polyethylene Melts. Part II. Fractions and Blends", Journal of Applied Polymer Science, 1965, vol. 9, No. 2, pp. 767-776.
Janzen et al., "Diagnosing Long-Chain Branching in Polyethylenes", Journal of Molecular Structure 485-486, 1999, pp. 569-584.
Kim et al., "New Half-Metallocene Catalysts Generating Polyethylene with Bimodal Molecular Weight Distribution and Syndiotactic Polystyrene", Macromolecular Rapid Communications, 2001, vol. 22, No. 8, pp. 573-578.
Robertson et al., "Extent of Branching from Linear Viscoelasticity of Long-Chain-Branched Polymers", Journal of Polymer Science Part B: Polymer Physics, 2004, vol. 42, No. 9, pp. 1671-1684.
Soares et al., "Deconvolution of Chain-Length Distributions of Linear Polymers Made by Multiple-Site-Type Catalysts", Polymer, 1995, vol. 36, No. 11, pp. 2257-2263.
Thorshaug et al., "Pressure Effects on Termination Mechanisms During Ethene Polymerization Catalyed by Dicyclopentadienylzirconium Dichloride/Methylaluminoxane", Macromolecular Rapid Communications, 1997, vol. 18, No. 8, pp. 715-722.
Thorshaug et al., "Termination, Isomerization, and Propagation Reactions during Ethene Polymerization Catalyzed by $Cp_2Zr$-$R^+$ and $Cp^*_2Zr$-$R^+$. An Experimental and Theoretical Investigation", Macromolecules, 1998, vol. 31, No. 21, pp. 7149-7165.
Piel et al., "Structure-Property Relationships of Linear and Long-Chain Branched Metallocene High-Density Polyethylenes Characterized by Shear Rheology and SEC-MALLS", Macromol. Chem. Phys., 2006, vol. 207, pp. 26-38.
Fraser, William A., et al., "Manufacturing Efficiencies From Metallocene Catalysis in Gas-Phase Polyethylene Production", Univation Technologies, 1997, pp. 1-8.
Kou, Bo, et al., "Gas-Phase Ethylene/Hexene Copolymerization with Metallocene Catalyst in a Laboratory-Scale Reactor", Ind. Eng. Chem. Res., 2005, 44, pp. 2443-2450.

*Primary Examiner* — Caixia Lu
(74) *Attorney, Agent, or Firm* — Catherine L. Bell; Kevin M. Faulkner

(57) ABSTRACT

The invention describes the preparation of long chain branching in high density polyethylene by using metallocene catalysts in the presence of ethylene.

14 Claims, 7 Drawing Sheets

USE OF TEMPERATURE AND ETHYLENE PARTIAL PRESSURE TO INTRODUCE LONG CHAIN BRANCHING IN HIGH DENSITY POLYETHYLENE

FIELD OF THE INVENTION

The invention relates generally to the preparation of long chain branching in high density polyethylene by using metallocene catalysts.

BACKGROUND OF THE INVENTION

Considerable commercial success has now been attained with metallocene catalysts; both supported and homogeneous. Success has been in product design for LLDPE, VLDPE, plastomers, and elastomers, where control of linear alpha-olefin comonomer incorporation efficiency and composition distribution coupled with molecular weight distribution has lead to substantially enhanced properties of value to customers. These include puncture resistance, gloss/haze, tear strength, and permeability. More recently, improved melt state properties have also been brought to commercial operations with metallocene offerings such as Enable™ LLDPE.

Metallocene and other single site catalysts have had less impact in high density polyethylene where comonomer concentration is very low and consequently comonomer distribution and incorporation efficiency are less important. Nonetheless, occasionally efforts have been made to employ metallocene catalysts for HDPE design (see Macromolecular Materials and Engineering, 2005, 290(6), pp. 610-620, U.S. Pat. Nos. 7,576,163, and 7,148,298). A common strategy has involved mixing two metallocene catalysts on the same support (see Macromolecular Rapid Communications, 2001. 22(8): p. 573-578). Apparently, it has proven difficult to find two metallocenes with sufficiently different molecular weight capability to achieve the proper balance of melt rheological and solid state characteristics.

U.S. Pat. No. 7,625,982 discloses multimodal polyethylene compositions, having at least two PE components made using two catalyst compounds and specifically discloses higher density polyethylenes at Table 3, runs 10-16. Note the examples all have Mw/Mns over 4.5.

EP 659 773 B1 discloses gas phase polymerization processes at a temperature above 65° C. using unsupported catalysts for producing polyethylene containing long chain branches (up to 3 long chain branches per 1000 C's). Note the highest density in the examples is 0.940 for an MI less than 5 dg/min.

U.S. Application Publication No. 2011/0059278 discloses in Table 1, page 2, a polyethylene (R11) having a density of 0.960, a Tm of 137° C., an MI of 7.39 dg/min, and a long chain branch index of 0.14 prepared using a bridged bis(tetrahydroindenyl) based catalyst system.

U.S. Application Publication No. 2005/0020438 discloses in Table 1, page 4, Example 3, use of a supported dimethylsilylbis(tetrahydroindenyl)zirconium dichloride and MAO in a slurry polymerization to produce polyethylene having an Mw of 329,000 and an HLMI of 0.27 g/10 min.

Other references of interest include: EP 1 217 013 A2; EP 743 324 B1; and EP 700 937 B1.

Up until the time of the present invention, little progress has been made in obtaining long chain branching in HDPE products made with supported metallocene catalysts. Up to now, only supported chromium catalysts are used commercially to produce HDPEs containing a modest—but important—population of long chain branching. The broad—often bimodal—molecular weight distribution and the long chain branching offer melt strength improvements in film blowing and blow molding, respectively.

Therefore, a need exists for a product and process that overcomes one or more of the current disadvantages noted above.

BRIEF SUMMARY OF THE INVENTION

This invention relates to a long chain branched high density ethylene polymer having: at least 50 mol % ethylene, a density of from 0.950 g/cm$^3$ to 0.96 g/cm$^3$, an Mw/Mn of 4.5 or less, a melt index (190° C., 2.16 kg) of 5 dg/min or less, an Mw of 50,000 or more, a g'$_{(Zave)}$ of 0.975 or less, high load melt index (190° C., 21.6 kg) of 1.0 dg/min or more; and wherein polyethylene having an Mw of 1000 or less are present at less than 5 wt %, based upon the weight of the polyethylene polymer.

DEFINITIONS

Figure 1A:
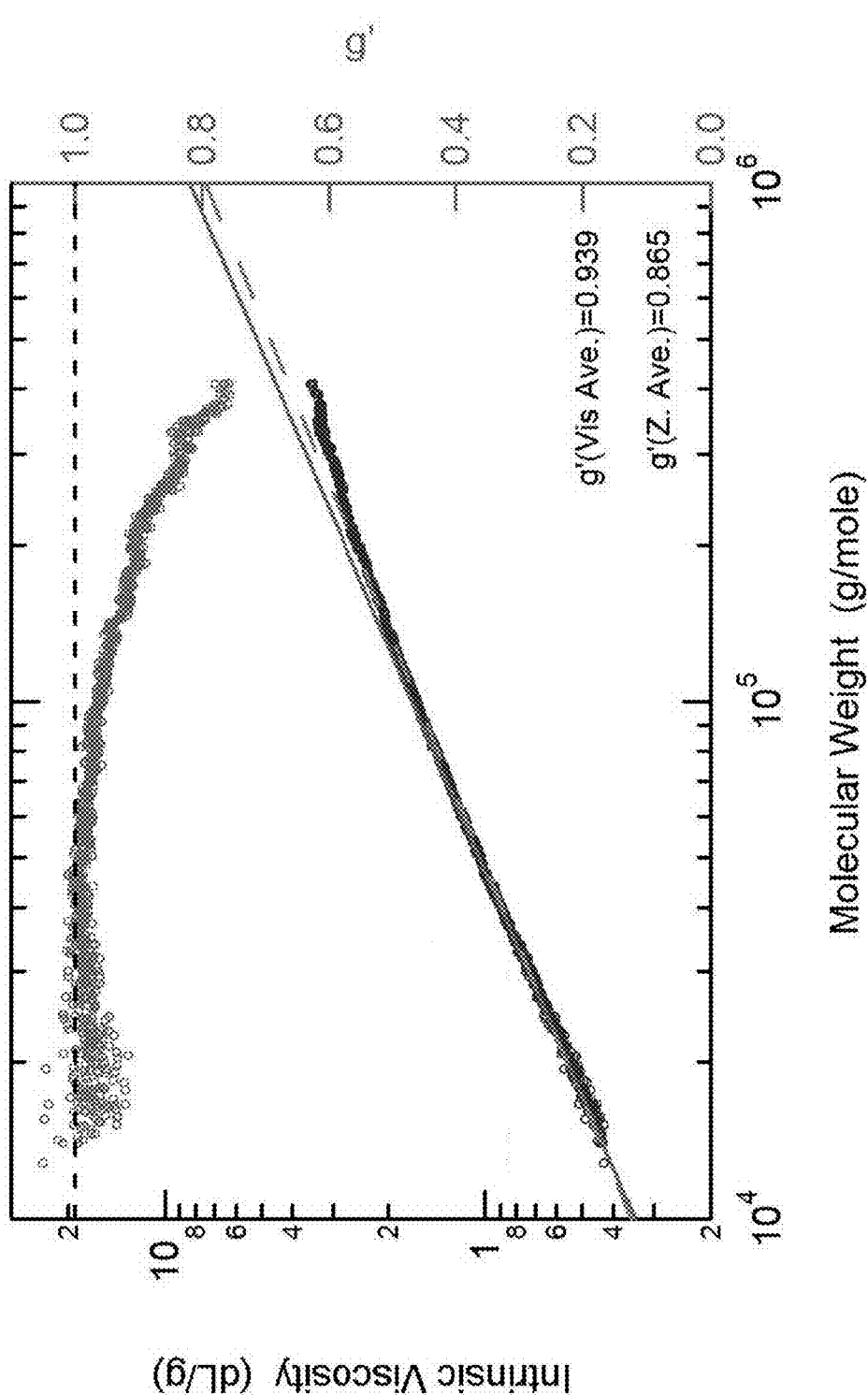
FIG. 1a depicts molecular weight and intrinsic viscosity for Example 13.
Figure 1B:
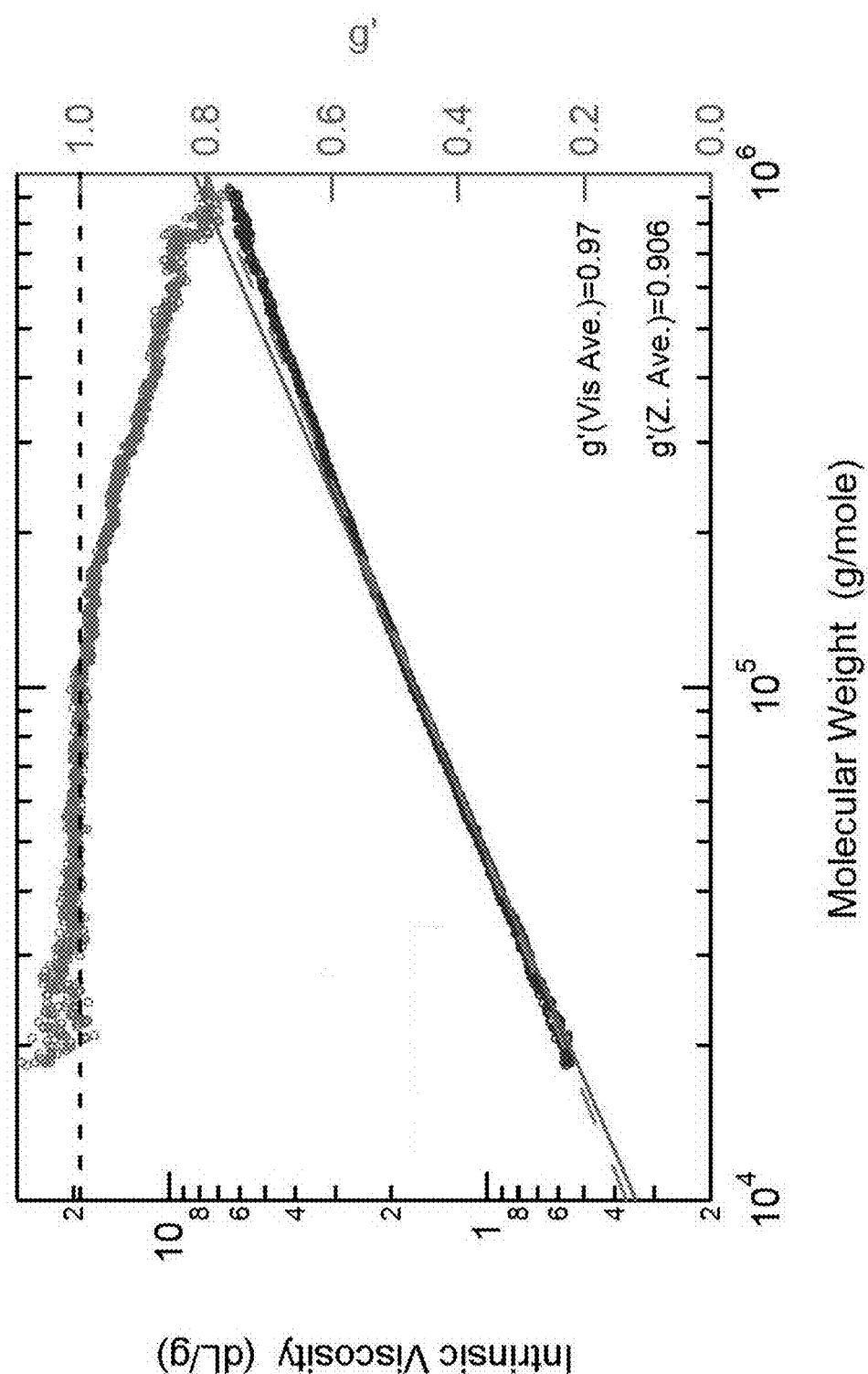
FIG. 1b depicts molecular weight and intrinsic viscosity for Example 14.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, including, but not limited to ethylene, hexene, and diene, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. The term "different" as used to refer to mer units indicates that the mer units differ from each other by at least one atom or are different isomerically. Accordingly, the definition of copolymer, as used herein, includes terpolymers and the like. Thus, as used herein, the terms "polyethylene," "ethylene polymer," and "ethylene based polymer" mean a polymer or copolymer comprising at least 50 mol % ethylene units (preferably at least 70 mol % ethylene units, more preferably at least 80 mol % ethylene units, even more preferably at least 90 mol % ethylene units, even more preferably at least 95 mol % ethylene units or 100 mol % ethylene units (in the case of a homopolymer)). Furthermore, the term "polyethylene composition" means a blend containing one or more polyethylene components. The terms "polypropylene," "propylene polymer," and "propylene based polymer" mean a polymer or copolymer comprising greater than 50 mol % propylene units.

For purposes of this invention and the claims thereto, an ethylene polymer having a density of 0.86 g/cm$^3$ or less is referred to as an ethylene elastomer or elastomer, an ethylene polymer having a density of more than 0.86 g/cm$^3$ to less than 0.910 g/cm$^3$ is referred to as an ethylene plastomer or plastomer; an ethylene polymer having a density of 0.910 g/cm$^3$ to 0.940 g/cm$^3$ is referred to as a low density polyethylene (LDPE) (LDPE includes linear low density polyethylene "LLDPE" which refers to ethylene polymers in this density range made using a heterogeneous catalyst, as well as ethylene polymers in this density range made in a high pressure process using a free radical catalyst); and an ethylene polymer having a density of more than 0.940 g/cm$^3$ (preferably from about 0.945 g/cm$^3$ to 0.98 g/cm$^3$) is referred to as a high density polyethylene (HDPE). For these definitions, density is determined using the method described under ASTM D 1505.

For purposes of this invention and the claims thereto, when melting point (Tm) is referred to and there is a range of melting temperatures, the melting point is defined to be the peak melting temperature from a differential scanning calorimetry (DSC) trace as described below under Test Methods section, paragraph [0332], page 24, in U.S. Application Publication No. 2006/0173123 (as modified in the Experimental section below) including the references cited therein; and when there is more than one melting peak, it refers to the peak melting temperature for the largest peak among principal and secondary melting peaks, as opposed to the peak occurring at the highest temperature, thereby reflecting the largest contribution to the calorimetric response of the material.

For purposes of this invention and the claims thereto, Melt Index (MI) is determined according to ASTM 1238 (190° C., 2.16 kg) and is reported in g/10 min or dg/min; Melt Index Ratio (MIR) is I21/I2 as determined by ASTMD 1238; High load Melt Index (HLMI is determined according to ASTM D 1238 (190° C., 21.6 kg); in the event a polymer has an unmeasureable melt index at 190° C. and 2.16 kg, (such as, for example, when it has a molecular weight too high to measure the melt index at 190° C. and 2.16 kg) it will be presumed to have a melt index of less than 0.1 dg/min; differential scanning calorimetry (DSC) is performed as described under Test Methods section, paragraph [0332], page 24, in U.S. Application Publication No. 2006/0173123, including the references cited therein, as modified in the Experimental section below; Molecular weight distribution is defined to be Mw divided by Mn; unless otherwise stated, Mw, Mn, and Mz are determined by Size Exclusion Chromatography (GPD-DRI) as described under Test Methods section, paragraph [0334] et seq., page 24-25, in U.S. Application Publication No. 2006/0173123, including the references cited therein.

DETAILED DESCRIPTION

The present invention relates to the impact of ethylene partial pressure and temperature, among other things, on the properties of HDPE made with a supported metallocene catalyst. In a preferred embodiment, catalyst productivity increases with temperature over the range 70° C. to 100° C. and, at a given temperature, increases roughly linearly with ethylene pressure. The instant invention shows that long chain branching is greater in high density polyethylene produced using metallocenes under lower ethylene partial pressure and higher temperature conditions.

This invention relates to a long chain branched high density ethylene polymer having:

at least 50 mol % ethylene (preferably at least 70 mol %, preferably at least 75 mol %, preferably at least 80 mol %, preferably at least 90 mol %, preferably at least 95 mol %, preferably at least 97 mol %, preferably at least 98 mol %);

a density of greater than 0.950 g/cc, (preferably 0.950 g/cm$^3$ to 0.97 g/cm$^3$, preferably from 0.955 g/cm$^3$ to 0.960 g/cm$^3$);

an Mw/Mn of 4.5 or less (preferably less than 4.0);

a melt index (190° C., 2.16 kg) of 5 dg/min or less (preferably 4 dg/min or less, preferably 3 dg/min or less);

an Mw of 50,000 or more (preferably 60,000 g/mol or more; preferably 70,000 g/mol or more; preferably 100,000 g/mol or more);

a $g'_{(Zave)}$ of 0.975 or less (preferably 0.950 or less, preferably 0.930 or less, preferably 0.900 or less, preferably 0.890 or less);

high load melt index (190° C., 21.6 kg) of 1.0 dg/min or more (preferably 2.0 or dg/min or more, preferably 3.0 or dg/min or more, preferably 4.0 or dg/min or more, preferably 5.0 or dg/min or more, preferably 10.0 or dg/min or more); and wherein polyethylene having an Mw of 1000 or less are present at less than 5 wt % (preferably at 4 wt % or less, preferably at 3 wt % or less, preferably at 2 wt % or less, preferably at 1 wt % or less, preferably at 0 wt %), based upon the weight of the polyethylene polymer and as determined by GPC-DRI.

The phrase "long chain branched high density polyethylene" ("LCB-HDPE") is defined to mean an ethylene polymer having a density of 0.950 g/cm$^3$ or more (ASTM D 1505) and a branching index, $g'_{(Zave)}$, of 0.95 or less, determined as described in the Experimental section below.

Useful LCB-HDPE's include those polymers disclosed herein that are prepared from a reaction between ethylene, a metallocene, and an activator, such as methyl aluminoxane (also referred to as methylalumoxane).

Any LCB-HDPEs described herein may also have one or more of: 1) a vinyl content (group/1000) of less than 0.10 (preferably less than 0.08); and/or 2) vinylene content (group/1000) of less than 0.40 (preferably less than 0.37); and/or 3) long chain branching content (group/1000) of from about 0.1 to about 0.5, e.g., about 0.475. Vinyl content (group/1000), vinylene content (group/1000), and long chain branching content (group/1000) are determined by $^1$HNMR, as described in the Experimental section below and as described in U.S. Application Publication No. 2009/0318644 (U.S. Ser. No. 12/143,663, filed Jun. 20, 2008), particularly the procedure described on page 33 line 25 to page 34, line 11, of the application as filed.

LCB-HDPE polymers produced herein may also have a gel stiffness of more than 10,000 Pa*s", preferably at least 11,000 Pa*s", and more preferably at least 12,000 Pa*s" (determined at 190° C., as described in the Experimental section below). A preferred relaxation exponent n for the LCB-HDPE polymers produced herein is less than 1 and more than 0, generally, n will be between 0.3 and 0.92, preferably between 0.35 and 0.85 (determined as described in the Experimental section below). The closer n is to 1, the fewer long chain branches will be present.

In another preferred embodiment, the LCB-HDPE polymer produced herein has a GPC trace having one or two peaks or one or two inflection points, preferably one peak or inflection point. An inflection point is that point where the second derivative of the curve changes in sign (e.g., from negative to positive or vice versa). In a preferred embodiment, the GPC trace is unimodal, indicating that the Mw/Mn of the LCB-HDPE is unimodal and preferably narrow (e.g., less than 4.5).

In another preferred embodiment, the LCB-HDPE polymer produced herein has a Tm (DSC) of 125° C. or more, preferably 130° C. or more, preferably 132° C. or more, preferably 133° C. or more, alternately from 131° C. to 137° C.

In another preferred embodiment, the LCB-HDPE polymer produced herein has a $g'_{(vis\ ave)}$ of 0.975 or less (preferably 0.960 or less, preferably 0.940).

In another preferred embodiment, the LCB-HDPE polymer produced herein has an MIR (I21/I2) of greater than 30, preferably greater than 40, preferably greater than 50, preferably greater than 60.

In another preferred embodiment, the LCB-HDPE polymer produced herein has a Mn of 20,000 g/mol or more, preferably 25,000 g/mol or more.

In another preferred embodiment, the LCB-HDPE polymer produced herein has a Mz of 250,000 g/mol or more, preferably 175,000 g/mol or more, preferably 200,000 g/mol or more, preferably 250,000 g/mol or more.

In another preferred embodiment, the LCB-HDPE polymer produced herein comprises 3 mol % or less of comonomer, preferably 2 mol % or less, preferably 1 mol % or less, preferably 0 mol %.

Process to Produce LCB-HDPE

The LCB-HDPE described herein are typically produced by combining a catalyst compound, an activator, an optional support (typically a silica support) and optional scavenger with ethylene, an optional $C_3$ to $C_{40}$ alpha olefin and, optionally a diene. For the purposes of this invention and the claims thereto, when a catalyst system, a catalyst compound, an activator, etc., are described as comprising neutral stable forms of the components, it is well understood by one of ordinary skill in the art, that the ionic form of the component is the form that reacts with the monomers to produce polymers.

A catalyst system is the combination of a catalyst compound with an activator and optional support and optional scavenger or co-activator. The terms "cocatalyst" and "activator" are used herein interchangeably and are defined to be any compound which can activate any one of the catalyst compounds described above by converting the neutral catalyst compound to a catalytically active catalyst cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic, and providing a charge-balancing noncoordinating or weakly coordinating anion.

Catalyst Compounds

Catalyst compounds useful to produce the LCB-HDPE's described herein include metallocene catalyst compounds. A metallocene catalyst compound is defined as a bridged or unbridged organometallic (preferably group 4 metal) compound with at least one π-bound cyclopentadienyl moiety (or substituted cyclopentadienyl moiety) and more frequently two π-bound cyclopentadienyl moieties or substituted cyclopentadienyl moieties.

In a preferred embodiment, in any of the processes described herein, one metallocene catalyst compound is used, e.g., the metallocene catalyst compounds are not substantially different, preferably the metallocene catalyst compounds are not different. Generally, metallocene catalyst compounds are not substantially different if they produce the same polymer having the same Mw (GPC), same Mw/Mn (GPC), same mol % comonomer incorporation ($^{13}$C NMR), and same comonomer distribution ([HHH] triad by $^{13}$C NMR, [HHH] triad is calculated as set out in U.S. Ser. No. 61/541,448, filed Sep. 30, 2011) at the same activity (g/mmol/hour), where same means within 5% relative to each other, preferably within 4%, preferably within 3%, preferably within 2%, preferably within 1%. Specifically, however, for purposes of this invention and the claims thereto, one metallocene catalyst compound is considered different from another if they differ by at least one atom, not including the anionic leaving groups (such as the X groups in the metallocene formulae below). For example, "bisindenyl zirconium dichloride" is different from "(indenyl)(2-methylindenyl)zirconium dichloride" which is different from "(indenyl)(2-methylindenyl)hafnium dichloride," but "bisindenyl zirconium dichloride" is not different from "bisindenyl zirconium dimethyl." Metallocene catalyst compounds that differ only by isomer are considered not different for purposes if this invention, e.g., rac-dimethylsilylbis(2-methyl 4-phenyl)hafnium dimethyl is considered to be not different from meso-dimethylsilylbis(2-methyl 4-phenyl)hafnium dimethyl. Likewise, for purposes of this invention and the claims thereto, it is recognized that group 4 metals are often difficult to purify; therefore, a metallocene may have 1 wt % or less (preferably 0.1 wt % or less, preferably 0.001 wt % or less) of other group 4 metal(s) analogs and still be considered as "not different." For example, hafnium is known to often have zirconium contaminants; therefore, the presence of bisindenyl zirconium dimethyl at 1 wt % or less in bisindenyl hafnium dimethyl, would be considered "not different."

In a preferred embodiment, the metallocene catalyst compound is represented by the formula: $(Cp^A)(Cp^B)MX_2$; $T(Cp^A)(Cp^B)MX_2$; $(JR)(Cp^B)MX_2$; or $T(JR)(Cp^B)MX_2$ where: M is a Group 4 metal (preferably Zr, Hf, or Ti); each X is independently an anionic leaving group; T is a bridging group bridging $Cp^A$ and $Cp^B$ or $Cp^A$ and JR; $Cp^A$ and $Cp^B$ same or different substituted or unsubstituted fluorenyl, indenyl or cyclopentadienyl groups and $Cp^A$ and $Cp^B$ are each bound to M; J is a group 15 or 16 heteroatom, and R is a substituted or unsubstituted hydrocarbyl group.

In a preferred embodiment, the metallocene catalyst compound is represented by the formula: $(Cp^A)(Cp^B)MX_2$ or $T(Cp^A)(Cp^B)MX_2$;

where M is Hf or Zr, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is one or more of Cl, Br, I, or a $C_1$ to $C_{12}$ alkyl group), T is represented by the formula $R_2^aL$, where L is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system (preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p-(Et)_3SiPh)_2C$, and silylcyclopentyl ($Si(CH_2)_4$)); $Cp^A$ and $Cp^B$ are substituted or unsubstituted indenyl groups (preferably tetrahydroindenyl groups).

In a particularly preferred embodiment, the metallocene catalyst compound is represented by the formula: $T(Cp^A)(Cp^B)MX_2$;

where M is Hf or Zr, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system) (preferably each X is one or more of Cl, Br, I, or a $C_1$ to $C_{12}$ alkyl group), T is represented by the formula $R_2{}^aL$, where L is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system (preferably, T is a bridging group comprising carbon or silica, such as dialkylsilyl, preferably T is selected from $CH_2$, $CH_2CH_2$, $C(CH_3)_2$, $SiMe_2$, $SiPh_2$, SiMePh, silylcyclobutyl ($Si(CH_2)_3$), $(Ph)_2C$, $(p\text{-}(Et)_3SiPh)_2C$, and silylcyclopentyl ($Si(CH_2)_4$)); $Cp^A$ and $Cp^B$ are substituted or unsubstituted π-bound cyclopentadienyl moieties, preferably substituted or unsubstituted cyclopentadienyl, fluorenyl or indenyl groups, where at least one of $Cp^A$ and $Cp^B$ is substituted, preferably both are substituted.

In any of the catalyst formulae above, each $Cp^A$ and $Cp^B$ may be unsubstituted or substituted with any one or combination of substituent groups R. Non-limiting examples of substituent groups R include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, aryloxys, acylaminos, aroylaminos, and combinations thereof. More particular non-limiting examples of alkyl substituents R include methyl, ethyl, propyl, butyl, pentyl, hexyl, cyclopentyl, cyclohexyl, benzyl, phenyl, methylphenyl, tert-butylphenyl groups, and the like, including all their isomers, for example tertiary-butyl, isopropyl, and the like. Other possible radicals include substituted alkyls and aryls, such as, for example, fluoromethyl, fluoroethyl, difluoroethyl, iodopropyl, bromohexyl, chlorobenzyl, and hydrocarbyl substituted organometalloid radicals including trimethylsilyl, trimethylgermyl, methyldiethylsilyl, and the like; halocarbyl-substituted organometalloid radicals including tris(trifluoromethyl)silyl, methylbis(difluoromethyl)silyl, bromomethyldimethylgermyl, and the like; disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide, and ethylsulfide. Other substituents R include olefins, such as, but not limited to, olefinically-unsaturated substituents including vinyl-terminated ligands, for example 3-butenyl, 2-propenyl, 5-hexenyl, and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron, and combinations thereof.

In a particularly preferred embodiment herein, the metallocene catalyst compound is bridged, substituted on at least one π-bound cyclopentadienyl moiety, preferably both, and is a catalyst known to make vinyl termination.

Metallocene catalyst compounds useful herein include one or more of:
bis(1-methyl,3-n-butyl cyclopentadienyl)zirconium dimethyl;
dimethylsilyl bis(tetrahydroindenyl)zirconium dimethyl;
dimethylsilyl bis(indenyl)hafnium dimethyl;
(n-propylcyclopentadienyl)(cyclopentadienyl)zirconium dimethyl;
(isopropylcyclopentadienyl)(cyclopentadienyl)zirconium dimethyl;
dimethylsilyl(3-n-propylcyclopentadienyl)(cyclopentadienyl)zirconium dimethyl;
dimethylsilylbis(2-n-propyl, 3-methyl indenyl)zirconium dimethyl;
dimethylsilylbis(2-methyl,3-propyl indenyl)zirconium dimethyl; and
bis(triethylsilylphenyl)methylene (cyclopentadienyl)(2,3-di-t-butyl fluorenyl)hafnium dimethyl.

Examples of useful catalyst compounds can be found in U.S. Pat. Nos. 6,774,191; 6,555,635, and the like.

Activators

The terms "cocatalyst" and "activator" are used herein interchangeably and are defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds (such as methyl alumoxane), modified alumoxane compounds, and ionizing anion precursor compounds that abstract a reactive, σ-bound, metal ligand making the metal complex cationic and providing a charge-balancing noncoordinating or weakly coordinating anion.

In one embodiment, alumoxane activators are utilized as an activator in the catalyst composition. Examples of useful alumoxanes include methylalumoxane (MAO), modified methylalumoxane (MMAO), ethylalumoxane, and isobutylalumoxane.

In one embodiment, alumoxane activators are utilized as an activator in the catalyst composition. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide, or amide. Mixtures of different alumoxanes and modified alumoxanes may also be used. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584).

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio. Alternate preferred ranges include up to 500:1, alternately up to 200:1, alternately up to 100:1, alternately from 1:1 to 50:1.

Non-coordinating anions may be used as activators herein. The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this invention are those that are compatible, stabilize the transition metal cation in the sense of balancing its ionic charge at +1, and yet retain sufficient lability to permit displacement during polymerization.

It is within the scope of this invention to use an ionizing or stoichiometric activator, neutral or ionic, such as tri(n-butyl) ammonium tetrakis(pentafluorophenyl)borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium, and indium, or mixtures thereof. The three substituent groups are each independently selected from alkyls, alkenyls, halogens, substituted alkyls, aryls, arylhalides, alkoxy, and halides. Preferably, the three groups are independently selected from halogen, mono or multicyclic (including halosubstituted) aryls, alkyls, and alkenyl compounds, and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, naphthyl, or mixtures thereof. Even more preferably, the three groups are halogenated, preferably fluorinated, aryl groups. A preferred neutral stoichiometric activator is tris perfluorophenyl boron or tris perfluoronaphthyl boron.

Ionic stoichiometric activator compounds may contain an active proton, or some other cation associated with, but not coordinated to, or only loosely coordinated to, the remaining ion of the ionizing compound. Such compounds and the like are described in EP 0 570 982 A; EP 0 520 732 A; EP 0 495 375 A; EP 0 500 944 B1; EP 0 277 003 A; EP 0 277 004 A; U.S. Pat. Nos. 5,153,157; 5,198,401; 5,066,741; 5,206,197; 5,241,025; 5,384,299; 5,502,124; and U.S. patent application Ser. No. 08/285,380, filed Aug. 3, 1994; all of which are herein fully incorporated by reference.

Preferred compounds useful as an activator in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic, diolefinic and acetylenically unsaturated substrates or other neutral Lewis bases, such as ethers, amines, and the like. Two classes of useful compatible non-coordinating anions have been disclosed in EP 0 277,003 A1, and EP 0 277,004 A1:1) anionic coordination complexes comprising a plurality of lipophilic radicals covalently coordinated to and shielding a central charge-bearing metal or metalloid core; and 2) anions comprising a plurality of boron atoms such as carboranes, metallacarboranes, and boranes.

In a preferred embodiment, the stoichiometric activators include a cation and an anion component, and are preferably represented by the following formula (II):

$$(Z)_d^+ (A^{d-}) \qquad (II)$$

wherein Z is (L-H) or a reducible Lewis Acid, L is a neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids, such as protonated Lewis bases capable of protonating a moiety, such as an alkyl or aryl, from the bulky ligand metallocene containing transition metal catalyst precursor, resulting in a cationic transition metal species. Preferably, the activating cation (L-H)$_d^+$ is a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N, N-dimethylaniline, phosphoniums from triethylphosphine, triphenylphosphine, and diphenylphosphine, oxoniums from ethers, such as dimethyl ether diethyl ether, tetrahydrofuran, and dioxane, sulfoniums from thioethers, such as diethyl thioethers and tetrahydrothiophene, and mixtures thereof.

When Z is a reducible Lewis acid it is preferably represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. In a preferred embodiment, the reducible Lewis acid is triphenyl carbenium.

The anion component A$^{d-}$ include those having the formula [M$^{k+}$Q$_n$]$^{d-}$ wherein k is 1, 2, or 3; n is 1, 2, 3, 4, 5, or 6, preferably 3, 4, 5, or 6; n−k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide, and two Q groups may form a ring structure. Preferably, each Q is a fluorinated hydrocarbyl group having 1 to 20 carbon atoms, more preferably each Q is a fluorinated aryl group, and most preferably each Q is a pentafluoryl aryl group. Examples of suitable A$^{d-}$ components also include diboron compounds as disclosed in U.S. Pat. No. 5,447,895, which is fully incorporated herein by reference.

In another embodiment, the NCA is a Bulky activator. A "Bulky activator," as used herein, refers to anionic activators represented by the formula:

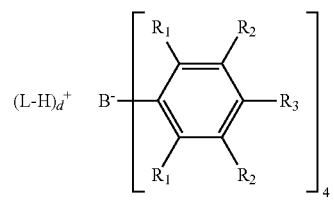

where:
each R$_1$ is, independently, a halide, preferably a fluoride;
each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_2$ is a fluoride or a perfluorinated phenyl group);

each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);

L is a neutral Lewis base;

(L-H)$^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple 'Back of the Envelope' Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
|---|---|
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary activators useful herein include one or more of:
N,N-dimethylanilinium tetrakis(pentafluorophenyl)borate;
triphenylcarbenium tetrakis(pentafluorophenyl)borate;
trimethylammonium tetrakis(perfluoronaphthyl)borate;
triethylammonium tetrakis(perfluoronaphthyl)borate;
tripropylammonium tetrakis(perfluoronaphthyl)borate;
tri(n-butyl)ammonium tetrakis(perfluoronaphthyl)borate;
tri(t-butyl)ammonium tetrakis(perfluoronaphthyl)borate;
N,N-dimethylanilinium tetrakis(perfluoronaphthyl)borate;
N,N-diethylanilinium tetrakis(perfluoronaphthyl)borate;
N,N-dimethyl-(2,4,6-trimethylanilinium)tetrakis(perfluoronaphthyl)borate;
tropillium tetrakis(perfluoronaphthyl)borate;
triphenylcarbenium tetrakis(perfluoronaphthyl)borate;
triphenylphosphonium tetrakis(perfluoronaphthyl)borate;
triethylsilylium tetrakis(perfluoronaphthyl)borate;
benzene(diazonium)tetrakis(perfluoronaphthyl)borate;
trimethylammonium tetrakis(perfluorobiphenyl)borate;
triethylammonium tetrakis(perfluorobiphenyl)borate;
tripropylammonium tetrakis(perfluorobiphenyl)borate;
tri(n-butyl)ammonium tetrakis(perfluorobiphenyl)borate;
tri(t-butyl)ammonium tetrakis(perfluorobiphenyl)borate;
N,N-dimethylanilinium tetrakis(perfluorobiphenyl)borate;
N,N-diethylanilinium tetrakis(perfluorobiphenyl)borate;
N,N-dimethyl-(2,4,6-trimethylanilinium)tetrakis(perfluorobiphenyl)borate;
tropillium tetrakis(perfluorobiphenyl)borate;
triphenylcarbenium tetrakis(perfluorobiphenyl)borate;
triphenylphosphonium tetrakis(perfluorobiphenyl)borate;
triethylsilylium tetrakis(perfluorobiphenyl)borate;
benzene(diazonium)tetrakis(perfluorobiphenyl)borate;
[4-t-butyl-PhNMe$_2$H][(C$_6$F$_3$(C$_6$F$_5$)$_2$)$_4$B];
trimethylammonium tetraphenylborate;
triethylammonium tetraphenylborate;
tripropylammonium tetraphenylborate;
tri(n-butyl)ammonium tetraphenylborate;
tri(t-butyl)ammonium tetraphenylborate;
N,N-dimethylanilinium tetraphenylborate;
N,N-diethylanilinium tetraphenylborate;
N,N-dimethyl-(2,4,6-trimethylanilinium)tetraphenylborate;
tropillium tetraphenylborate;
triphenylcarbenium tetraphenylborate;
triphenylphosphonium tetraphenylborate;
triethylsilylium tetraphenylborate;
benzene(diazonium)tetraphenylborate;
trimethylammonium tetrakis(pentafluorophenyl)borate;
triethylammonium tetrakis(pentafluorophenyl)borate;
tripropylammonium tetrakis(pentafluorophenyl)borate;
tri(n-butyl)ammonium tetrakis(pentafluorophenyl)borate;
tri(sec-butyl)ammonium tetrakis(pentafluorophenyl)borate;
N,N-dimethylanilinium tetrakis(pentafluorophenyl)borate;
N,N-diethylanilinium tetrakis(pentafluorophenyl)borate;
N,N-dimethyl-(2,4,6-trimethylanilinium)tetrakis(pentafluorophenyl)borate;
tropillium tetrakis(pentafluorophenyl)borate;
triphenylcarbenium tetrakis(pentafluorophenyl)borate;
triphenylphosphonium tetrakis(pentafluorophenyl)borate;
triethylsilylium tetrakis(pentafluorophenyl)borate;
benzene(diazonium)tetrakis(pentafluorophenyl)borate;
trimethylammonium tetrakis-(2,3,4,6-tetrafluorophenyl)borate;
triethylammonium tetrakis-(2,3,4,6-tetrafluorophenyl)borate;
tripropylammonium tetrakis-(2,3,4,6-tetrafluorophenyl)borate;
tri(n-butyl)ammonium tetrakis-(2,3,4,6-tetrafluoro-phenyl)borate;
dimethyl(t-butyl)ammonium tetrakis-(2,3,4,6-tetrafluorophenyl)borate;
N,N-dimethylanilinium tetrakis-(2,3,4,6-tetrafluorophenyl)borate;
N,N-diethylanilinium tetrakis-(2,3,4,6-tetrafluorophenyl)borate;
N,N-dimethyl-(2,4,6-trimethylanilinium)tetrakis-(2,3,4,6-tetrafluorophenyl)borate;
tropillium tetrakis-(2,3,4,6-tetrafluorophenyl)borate;
triphenylcarbenium tetrakis-(2,3,4,6-tetrafluorophenyl)borate;
triphenylphosphonium tetrakis-(2,3,4,6-tetrafluorophenyl)borate;
triethylsilylium tetrakis-(2,3,4,6-tetrafluorophenyl)borate,
benzene(diazonium)tetrakis-(2,3,4,6-tetrafluorophenyl)borate;
trimethylammonium tetrakis(3,5-bis(trifluoromethyl)phenyl)borate;
triethylammonium tetrakis(3,5-bis(trifluoromethyl)phenyl)borate;

tripropylammonium tetrakis(3,5-bis(trifluoromethyl)phenyl)borate;
tri(n-butyl)ammonium tetrakis(3,5-bis(trifluoromethyl)phenyl)borate;
tri(t-butyl)ammonium tetrakis(3,5-bis(trifluoromethyl)phenyl)borate;
N,N-dimethylanilinium tetrakis(3,5-bis(trifluoromethyl)phenyl)borate;
N,N-diethylanilinium tetrakis(3,5-bis(trifluoromethyl)phenyl)borate;
N,N-dimethyl-(2,4,6-trimethylanilinium)tetrakis(3,5-bis(trifluoromethyl)phenyl)borate;
tropillium tetrakis(3,5-bis(trifluoromethyl)phenyl)borate;
triphenylcarbenium tetrakis(3,5-bis(trifluoromethyl)phenyl)borate;
triphenylphosphonium tetrakis(3,5-bis(trifluoromethyl)phenyl)borate;
triethylsilylium tetrakis(3,5-bis(trifluoromethyl)phenyl)borate;
benzene(diazonium)tetrakis(3,5-bis(trifluoromethyl)phenyl)borate;
di-(i-propyl)ammonium tetrakis(pentafluorophenyl)borate;
dicyclohexylammonium tetrakis(pentafluorophenyl)borate;
tri(o-tolyl)phosphonium tetrakis(pentafluorophenyl)borate;
tri(2,6-dimethylphenyl)phosphonium tetrakis(pentafluorophenyl)borate;
triphenylcarbenium tetrakis(perfluorophenyl)borate;
1-(4-(tris(pentafluorophenyl)borate)-2,3,5,6-tetrafluorophenyl)pyrrolidinium;
tetrakis(pentafluorophenyl)borate;
4-(tris(pentafluorophenyl)borate)-2,3,5,6-tetrafluoropyridine; and
triphenylcarbenium tetrakis(3,5-bis(trifluoromethyl)phenyl)borate).

Particularly, preferred activators include: methylalumoxane, modified methylalumoxane, N,N-dimethylanilinium tetrakis(heptafluoronaphthyl)borate, triphenylcarbenium tetrakis(heptafluoronaphthyl)borate, triphenylcarbenium tetrakis(perfluorophenyl)borate, N,N-dimethylanilinium tetrakis(pentafluorophenyl)borate, and the like.

Further, the typical NCA activator-to-catalyst ratio, e.g., all NCA activators-to-catalyst ratio is a 1:1 molar ratio. Alternate preferred ranges include from 0.1:1 to 100:1, alternately from 0.5:1 to 200:1, alternately from 1:1 to 500:1 alternately from 1:1 to 1000:1. A particularly useful range is from 0.5:1 to 10:1, preferably 1:1 to 5:1.

It is also within the scope of this invention that the catalyst compounds can be combined with combinations of alumoxanes and NCA's (see for example, U.S. Pat. Nos. 5,153,157; 5,453,410; EP 0 573 120 B1; PCT publications WO 94/07928; and WO 95/14044, which discuss the use of an alumoxane in combination with an ionizing activator).

Optional Support Materials

In embodiments herein, the catalyst system comprises an inert support material. Preferably the supported material is a porous support material, for example, talc and inorganic oxides. Other support materials include zeolites, clays, organoclays, or any other organic or inorganic support material and the like, or mixtures thereof.

Preferably, the support material is an inorganic oxide in a finely divided form. Suitable inorganic oxide materials for use in metallocene catalyst systems herein include Groups 2, 4, 13, and 14 metal oxides, such as silica, alumina, and mixtures thereof. Other inorganic oxides that may be employed, either alone or in combination with the silica or alumina, are magnesia, titania, zirconia, and the like. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably $SiO_2$, $Al_2O_3$, or $SiO_2/Al_2O_3$.

It is preferred that the support material, most preferably an inorganic oxide, has a surface area in the range of from about 10 $m^2$/g to about 700 $m^2$/g, pore volume in the range of from about 0.1 cc/g to about 4.0 cc/g and average particle size in the range of from about 5 µm to about 500 µm. More preferably, the surface area of the support material is in the range of from about 50 $m^2$/g to about 500 $m^2$/g, pore volume of from about 0.5 cc/g to about 3.5 cc/g and average particle size of from about 10 µm to about 200 µm. Most preferably, the surface area of the support material is in the range is from about 100 $m^2$/g to about 400 $m^2$/g, pore volume from about 0.8 cc/g to about 3.0 cc/g and average particle size is from about 5 µm to about 100 µm. The average pore size of the support material useful in the invention is in the range of from about 10 Å to about 1000 Å, preferably about 50 Å to about 500 Å, and most preferably about 75 Å to about 350 Å. In some embodiments, the support material is a high surface area, amorphous silica (surface area=300 $m^2$/gm; pore volume of 1.65 $cm^3$/gm). Preferred silicas are marketed under the tradenames of DAVISON 952 or DAVISON 955 by the Davison Chemical Division of W.R. Grace and Company. In other embodiments, DAVISON 948 is used.

Polymerization Processes to Produce LCB-HDPE

The LCB-HDPEs described herein may be produced using catalyst and activator described above in a solution, bulk, gas or slurry polymerization process, or a combination thereof, preferably a slurry or gas phase polymerization process. Suitable diluents/solvents for polymerization include non-coordinating, inert liquids.

Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof such as can be found commercially (Isopars); perhalogenated hydrocarbons, such as perfluorinated $C_{4-10}$ alkanes, chlorobenzene, and aromatic and alkyl-substituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, and 1-decene. Mixtures of the foregoing are also suitable.

In one embodiment, this invention is directed toward the slurry or gas phase polymerization reactions involving the polymerization of ethylene and, optionally, one or more comonomers having from 3 to 40 carbon atoms, preferably 4 to 20 carbon atoms, and more preferably 6 to 8 carbon atoms. Preferred comonomers include one or more of propylene, butene-1, pentene-1,4-methyl-pentene-1, hexene-1, octene-1, decene-1,3-methyl-pentene-1, and cyclic olefins, or a combination thereof.

One or more reactors, in series or in parallel, may be used to produce the LCB-HDPEs. Catalyst component and activator may be delivered as a solution or slurry, either separately to the reactor, activated in-line just prior to the reactor, or preactivated and pumped as an activated solution or slurry to the reactor. A preferred operation is two solutions activated in-line. For more information on methods to introduce multiple catalysts into reactors, please see U.S. Pat. No. 6,399,722 and PCT publication WO 01/30862A1. While these references may emphasize gas phase reactors, the techniques described are equally applicable to other types of reactors, including continuous stirred tank reactors, slurry loop reactors, and the like. Polymerizations are carried out in either single reactor operation, in which monomer, comonomers, catalyst/activator, scavenger, and optional LCB-HDPE are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors.

In one embodiment, 500 ppm or less of hydrogen is added to the polymerization, or 400 ppm or less, or 300 ppm or less. In other embodiments, at least 50 ppm of hydrogen is added to the polymerization, or 100 ppm or more, or 150 ppm or more.

Gas Phase

Gas phase polymerization, particularly a fluidized bed process, can be used to prepare the LCB-HDPE described herein. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference.)

Another process useful in the invention is where the process is operated in the absence of or essentially free of any scavengers, such as triethylaluminum, trimethylaluminum, tri-isobutylaluminum, tri-n-hexylaluminum, diethyl aluminum chloride, dibutyl zinc, and the like. This process is described in PCT publication WO 96/08520 and U.S. Pat. No. 5,712,352, which are herein fully incorporated by reference.

The metallocene catalyst compounds and activators described above are suitable for use in any gas phase polymerization process, including fluidized bed or stirred bed processes. Particularly preferred is a gas phase polymerization process in which one or more condensable fluids as described below is utilized. Typically in a gas phase polymerization process a continuous cycle is employed where in one part of the cycle of a reactor system, a cycling gas stream, otherwise known as a recycle stream or fluidizing medium is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. In a preferred process, a condensable fluid, as described below, is introduced to the process for purposes of increasing the cooling capacity of the recycle stream. The purposeful introduction of a condensable fluid into a gas phase process is a condensed mode process. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352, 749; 5,405,922; 5,436,304; 5,453,471; 5,462,999; 5,616,661; and 5,668,228; all of which are fully incorporated herein by reference.)

Condensable fluids useful herein include hydrocarbons, preferably having little to no solvent power (i.e. the ability to solubilize) regarding the reaction components, such as the monomer and polymer products. For the purposes of this patent application, the term condensable fluids include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane, and other saturated $C_7$ and $C_8$ hydrocarbons, or mixtures thereof. Preferred inert condensable hydrocarbons are $C_5$ and $C_6$ saturated hydrocarbons. The condensable fluids may also include polymerizable condensable comonomers, such as olefins, alpha-olefins, diolefins, diolefins containing at least one alpha-olefin, or mixtures thereof, including some of the aforementioned monomers which may be partially or entirely incorporated into the polymer product.

In a preferred gas phase process of the invention, the gas phase process is operated in a condensed mode, where a condensable fluid as described above, is introduced to the process to increase the cooling capacity of the recycle stream. In another embodiment, the invention relates to a gas phase process for polymerizing ethylene in a fluidized bed reactor, the process operating in a condensed mode in which a liquid and a gas are introduced to the fluidized bed reactor having a fluidizing medium or a stirred bed reactor having a medium, wherein the level of condensable fluid is greater than 5 wt %, preferably greater than 10 wt %, or greater than 15 wt % or greater than 20 wt %, more preferably greater than 25 wt %, even more preferably greater than 30 wt %, still even more preferably greater than 35 wt %, and most preferably greater than 30 wt % up to 60 wt %, preferably 50 wt %, based on the total weight of the liquid and gas entering the reactor. For further details of a condensed mode process, see U.S. Pat. Nos. 5,342,749 and 5,436,304, both of which are herein fully incorporated herein by reference.

To achieve higher cooling capacities, and enable higher reactor production rates it is desirable to raise the dew point temperature of the recycle stream to permit a higher level of condensing at the inlet to the gas phase reactor. The dew point temperature of the recycle stream is typically raised by increasing the operating pressure of the reaction/recycle system and/or increasing the percentage of condensable fluids and decreasing the percentage of non-condensable gases in the recycle stream. The advantages of a process operating in condensed mode generally increase directly with the nearness of the dew point temperature of the recycle stream to the reaction temperature within the interior of the fluidized bed. The advantages of the process may increase directly with the percentage of liquid in the recycle stream returned to the reactor. For a given inlet gas temperature, higher dew point temperatures cause an increased level of condensing (higher weight percent condensed). The higher condensing levels provide additional cooling and hence higher production rate capability in the reactor.

In one preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In a most preferred embodiment, the condensable fluid is introduced in amount greater than 10 wt % or greater than 15 wt % or greater than 20 wt %, preferably greater than 25 wt %, more preferably greater than 30 wt %, and most preferably greater than 40 wt % based on the total weight of fluidizing medium being reintroduced into the reactor.

In another preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In this embodiment, the condensable fluid is introduced in a concentration greater than 0.5 mol %, preferably greater than 1 mol %, preferably greater than 2 mol %, more preferably greater than 3 mol %, even more preferably greater than 4 mol %, still even more preferably greater than 5 mol %, and most preferably greater than 7 mol %, based on the total moles of gas in the reactor.

Other gas phase processes useful herein include those described in U.S. Pat. Nos. 5,627,242; 5,665,818; 5,677,375; European publications EP-A-0 794 200; EP-A-0 802 202; EP-A2 0 891 990; and EP-B-634 421; all of which are herein fully incorporated by reference.

The reactor pressure in any of the gas phase processes described in the above embodiments vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in any of the gas phase processes described in the above embodiments vary from about 30° C. to about 120° C., preferably from about 60° C. to about 115° C., more preferably in the range of from about 70° C. to 110° C., and most preferably in the range of from about 70° C. to about 100° C. In another embodiment, the polymerization temperature is above room temperature (23° C.), preferably above 30° C., preferably above 50° C., preferably above 70° C.

In a preferred embodiment, in any of the gas phase processes described in the above embodiments, the process is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr), and most preferably greater than 65,000 lbs/hr (29,000 Kg/hr) to greater than 100,000 lbs/hr (45,500 Kg/hr).

In another preferred embodiment of any of the embodiments of the process of invention herein, the amount of one or more condensable fluids is determined by the partial pressure of the condensable fluid(s) being introduced to the process, particularly into the reactor. In this embodiment, the partial pressure of the one or more condensable fluid(s) is in the range of from 1 psia (6.9 kPa) to 500 psia (3448 kPa), preferably is in the range from about 2 psig (13.8 kPa) to about 250 psia (1724 kPa), more preferably is in the range from 2 psia (13.8 kPa) to 100 psia (690 kPa), still more preferably in the range from about 5 psia (34.5 kPa) to 90 psia (621 kPa), and most preferably in the range of from 5 psia (34.5 kPa) to about 80 psia (552 kPa).

Slurry Phase

Slurry phase polymerization, particularly a slurry loop process, can be used to prepare the LCB-HDPE described herein. A slurry polymerization process generally operates between about 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process, where the temperature is kept below the temperature at which the polymer goes into solution. Such technique is well known in the art, and described in, for instance, U.S. Pat. No. 3,248,179, which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry, in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment, 500 ppm or less of hydrogen is added, or 400 ppm or less, or 300 ppm or less. In other embodiments, at least 50 ppm of hydrogen is added, or 100 ppm or more, or 150 ppm or more.)

The reactor is maintained at a pressure of 3620 kPa to 4309 kPa and at a temperature in the range of about 60° C. to about 104° C., depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer, and a nitrogen purge column in sequence for removal of the isobutane diluent and all unreacted monomer and comonomers. The resulting hydrocarbon free powder is then compounded for use in various applications.

In yet another embodiment in the slurry process useful in the invention, the concentration of predominant monomer in the reactor liquid medium is in the range of from about 1 wt % to about 10 wt %, preferably from about 2 wt % to about 7 wt %, more preferably from about 2.5 wt % to about 6 wt %, most preferably from about 3 wt % to about 6 wt %.

Another process, useful in the invention, is where the process, preferably a slurry process, is operated in the absence of or essentially free of any scavengers, such as triethylaluminum, trimethylaluminum, tri-isobutylaluminum, tri-n-hexylaluminum diethyl aluminum chloride, dibutyl zinc, and the like. This process is described in PCT publication WO 96/08520 and U.S. Pat. No. 5,712,352, which are herein fully incorporated by reference.

In another embodiment, the process is run with scavengers. Typical scavengers include trimethyl aluminum, tri-isobutyl aluminum and an excess of alumoxane or modified alumoxane.

In another embodiment, homogeneous polymerization, particularly a bulk or solution phase process, can be used to prepare the LCB-HDPE described herein. Generally this involves polymerization in a continuous reactor in which the polymer formed and the starting monomer and catalyst materials supplied are agitated to reduce or avoid concentration gradients. Suitable processes operate above the melting point of the polymers at high pressures, from 1 bar to 3000 bar (10 MPa to 30,000 MPa), in which the monomer acts as diluent or in solution polymerization using a solvent.

Temperature control in the reactor is obtained by balancing the heat of polymerization with reactor cooling by reactor jackets or cooling coils to cool the contents of the reactor, auto refrigeration, pre-chilled feeds, vaporization of liquid medium (diluent, monomers, or solvent), or combinations of all three. Adiabatic reactors with pre-chilled feeds may also be used. The reactor temperature depends on the catalyst used. In general, the reactor temperature preferably can vary between about 30° C. and about 160° C., more preferably from about 90° C. to about 150° C., and most preferably from about 100° C. to about 140° C. Polymerization temperature may vary depending on catalyst choice. In series operation, the second reactor temperature is preferably higher than the first reactor temperature. In parallel reactor operation, the temperatures of the two reactors are independent. The pressure can vary from 1 mm Hg to 2500 bar (25,000 MPa), preferably from 0.1 bar to 1600 bar (1 MPa to 16,000 MPa), most preferably from 1.0 bar to 500 bar (10 MPa to 5,000 MPa).

In one embodiment, 500 ppm or less of hydrogen is added to the polymerization, or 400 ppm or less, or 300 ppm or less. In other embodiments, at least 50 ppm of hydrogen is added to the polymerization, or 100 ppm or more, or 150 ppm or more.

Each of these processes may also be employed in single reactor, parallel or series reactor configurations. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See, also, PCT publications WO 96/33227 and WO 97/22639. All documents are incorporated by reference for US purposes for description of polymerization processes, metallocene selection and useful scavenging compounds.

In a particularly preferred embodiment, in any polymerization process the ethylene concentration or partial pressure is starved, e.g., purposely held at very low amounts, such as where the ethylene is present in the reactor at about 90 psi or less, preferably from about 45 psi to about 90 psi, preferably from about 50 psi to about 90 psi.

Preferably the starved polymerization process is used in combination with the a metallocene catalyst compound that is bridged, substituted on at least one $\pi$-bound cyclopentadienyl moiety, preferably both, and is known to make vinyl termination.

Applications

The LCB-HDPE's prepared herein may be used in a variety of end use applications, and may be used alone or in combination with other polymers in any application where HDPE polymers are currently used. Particularly, preferred applications include pipes, sheet, and film.

The enhanced properties of the LCB-HDPE compositions described herein are also useful in transparent articles, such as cook and storage ware, and in other articles, such as furniture, automotive components, toys, sportswear, medical devices, sterilizable medical devices and sterilization containers, nonwoven fibers and fabrics, and articles therefrom, such as drapes, gowns, filters, hygiene products, diapers, and films, oriented films, sheets, tubes, pipes, and other items where softness, high impact strength, and impact strength below freezing is important.

Additional examples of desirable articles of manufacture made from compositions of the invention include films, sheets, fibers, woven and nonwoven fabrics, automotive components, furniture, sporting equipment, food storage containers, transparent and semi-transparent articles, toys, tubing and pipes, sheets, packaging, bags, sacks, coatings, caps, closures, crates, pallets, cups, non-food containers, pails, insulation, and medical devices. Further examples include automotive components, wire and cable jacketing, pipes, agricultural films, geomembranes, toys, sporting equipment, medical devices, casting and blowing of packaging films, extrusion of tubing, pipes and profiles, sporting equipment, outdoor furniture (e.g., garden furniture) and playground equipment, boat and water craft components, and other such articles. In particular, the compositions are suitable for automotive components, such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Other useful articles and goods may be formed economically by the practice of our invention including: crates, containers, packaging, labware, such as roller bottles for culture growth and media bottles, office floor mats, instrumentation sample holders and sample windows; liquid storage containers, such as bags, pouches, and bottles for storage and IV infusion of blood or solutions, packaging material including those for any medical device or drugs including unit-dose or other blister or bubble pack, as well as for wrapping or containing food preserved by irradiation. Other useful items include medical tubing and valves for any medical device including infusion kits, catheters, and respiratory therapy, as well as packaging materials for medical devices or food which is irradiated including trays, as well as stored liquid, particularly water, milk, or juice, containers including unit servings and bulk storage containers as well as transfer means, such as tubing, pipes, and such.

Blends of LCB-HDPE

In some embodiments, the LCB-HDPE compositions produced by this invention may be blended with one or more other polymers (preferably at 0.1 wt % to 99.9 wt % LCB-HDPE, based upon the weight of the blend), including but not limited to, thermoplastic polymer(s) and/or elastomer(s).

By "thermoplastic polymer(s)" is meant a polymer that can be melted by heat and then cooled without appreciable change in solid-state properties before and after heating. Thermoplastic polymers typically include, but are not limited to, polyolefins, polyamides, polyesters, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, or mixtures of two or more of the above. Preferred polyolefins include, but are not limited to, polymers comprising one or more linear, branched or cyclic $C_2$ to $C_{40}$ olefins, preferably polymers comprising ethylene copolymerized with one or more $C_3$ to $C_{40}$ olefins, preferably a $C_3$ to $C_{20}$ alpha olefin, more preferably $C_3$ to $C_{10}$ alpha-olefins. A particularly preferred example is polybutene. The most preferred polyolefin is polypropylene. Other preferred polyolefins include, but are not limited to, polymers comprising ethylene including but not limited to ethylene copolymerized with a $C_3$ to $C_{40}$ olefin, preferably a $C_3$ to $C_{20}$ alpha olefin, more preferably propylene, butene, hexene, and/or octene.

By "elastomers" is meant all natural and synthetic rubbers, including those defined in ASTM D1566. Examples of preferred elastomers include, but are not limited to, ethylene propylene rubber, ethylene propylene diene monomer rubber, styrenic block copolymer rubbers (including SEBS, SI, SIS, SB, SBS, SIBS, and the like, where S=styrene, EB=random ethylene+butene, I=isoprene, and B=butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, polybutadiene rubber (both cis and trans).

In another embodiment, the blend comprising the LCB-HDPE may further be combined with one or more polymers polymerizable by a high-pressure free radical process, polyvinylchloride, polybutene-1, isotactic polybutene, ABS resins, block copolymer, styrenic block copolymers, polyamides, polycarbonates, PET resins, crosslinked polyethylene, copolymers of ethylene and vinyl alcohol (EVOH), polymers of aromatic monomers, such as polystyrene, poly-Testers, polyacetal, polyvinylidine fluoride, polyethylene glycols, and/or polyisobutylene.

In a preferred embodiment, the LCB-HDPE is present in the blend with one or more other polymers at from 0.1 wt % to 99.9 wt %, based upon the weight of the blend (preferably from 0.5 wt % to 99.5 wt %, preferably 1 wt % to 99 wt %, preferably 2 wt % to 98 wt %, preferably 3 wt % to 97 wt %, preferably 5 wt % to 95 wt %, preferably 10 wt % to 90 wt %). In preferred embodiments, the LCB-HDPE is blended with other ethylene polymers, preferably LLDPE, HDPE, LDPE, VLDPE, and the like.

Additives

The LCB-HDPE's compositions of the present invention may also contain other additives. Those additives include antioxidants, nucleating agents, acid scavengers, stabilizers, anticorrosion agents, plasticizers, blowing agents cavitating agents, surfactants, adjuvants, block, antiblock, UV absorbers, such as chain-breaking antioxidants, etc., quenchers, antistatic agents, slip agents, processing aids, UV stabilizers, neutralizers, lubricants, waxes, color masterbatches, pigments, dyes and fillers, and cure agents, such as peroxide. In a preferred embodiment, the additives may each individually be present at 0.01 wt % to 50 wt %, 0.01 wt % to 10 wt % in another embodiment, and from 0.1 wt % to 6 wt % in another embodiment, based upon the weight of the composition. In a preferred embodiment, dyes and other colorants common in the industry may be present from 0.01 wt % to 10 wt % and from 0.1 wt % to 6 wt % in another embodiment, based upon the weight of the composition. Preferred fillers, cavitating agents, and/or nucleating agents include titanium dioxide, calcium carbonate, barium sulfate, silica, silicon dioxide, carbon black, sand, glass beads, mineral aggregates, talc, clay, and the like.

In particular, antioxidants and stabilizers, such as organic phosphites, hindered amines, and phenolic antioxidants may be present in the LCB-HDPE's compositions of the invention from 0.001 wt % to 2 wt %, based upon the weight of the composition, in one embodiment, from 0.01 wt % to 0.8 wt % in another embodiment, and from 0.02 wt % to 0.5 wt % in yet another embodiment. Non-limiting examples of organic phosphites that are suitable are tris(2,4-di-tert-butylphenyl) phosphite (IRGAFOS 168) and di(2,4-di-tert-butylphenyl) pentaerithritol diphosphite (ULTRANOX 626). Non-limiting examples of hindered amines include poly[2-N,N'-di(2,2,6,6-tetramethyl-4-piperidinyl)-hexanediamine-4-(1-amino-1,1,3,3-tetramethylbutane)sym-triazine] (CHIMASORB 944) and bis(1,2,2,6,6-pentamethyl-4-piperidyl)sebacate (TINUVIN 770). Non-limiting examples of phenolic antioxidants include pentaerythrityl tetrakis(3,5-di-tert-butyl-4-hydroxyphenyl)propionate (IRGANOX 1010) and 1,3,5-Tri(3,5-di-tert-butyl-4-hydroxybenzyl-isocyanurate (IRGANOX 3114).

Fillers may be present from 0.001 wt % to 50 wt % in one embodiment, from 0.01 wt % to 25 wt %, based upon the weight of the composition, in another embodiment, and from 0.2 wt % to 10 wt % in yet another embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr, or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art, and may have the modifier of the invention pre-contacted, or pre-absorbed into the filler prior to addition to the ethylene polymer in one embodiment.

Metal salts of fatty acids may also be present in the LCB-HDPE's compositions of the present invention. Such salts may be present from 0.001 wt % to 1 wt % of the composition in one embodiment and from 0.01 wt % to 0.8 wt % in another embodiment. Examples of fatty acids include lauric acid, stearic acid, succinic acid, stearyl lactic acid, lactic acid, phthalic acid, benzoic acid, hydroxystearic acid, ricinoleic acid, naphthenic acid, oleic acid, palmitic acid, erucic acid, or any monocarboxylic aliphatic saturated or unsaturated acid having a chain length of 7 to 22 carbon atoms. Suitable metals include Li, Na, Mg, Ca, Sr, Ba, Zn, Cd, Al, Sn, Pb, and so forth. Preferable metal salts of fatty acids are magnesium stearate, calcium stearate, sodium stearate, zinc stearate, calcium oleate, zinc oleate, and magnesium oleate.

In a preferred embodiment, slip additives may be present in the LCB-HDPE compositions of this invention. Preferably, the slip additives are present at 0.001 wt % to 1 wt % (10 ppm to 10,000 ppm), more preferably 0.01 wt % to 0.5 wt % (100 ppm to 5000 ppm), more preferably 0.1 wt % to 0.3 wt % (1000 ppm to 3000 ppm), based upon the weight of the composition. Desirable slip additives include, but are not limited to, saturated fatty acid amides (such as palmitamide, stearamide, arachidamide, behenamide, stearyl stearamide, palmityl pamitamide, and stearyl arachidamide); saturated ethylene-bis-amides (such as stearamido-ethyl-stearamide, stearamido-ethyl-palmitamide, and palmitamido-ethyl-stearamide); unsaturated fatty acid amides (such as oleamide, erucamide, and linoleamide); unsaturated ethylene-bis-amides (such as ethylene-bis-stearamide, ethylene-bis-oleamide, stearyl-erucamide, erucamido-ethyl-erucamide, oleamido-ethyl-oleamide, erucamido-ethyl-oleamide, oleamido-ethyl-lerucamide, stearamido-ethyl-erucamide, erucamido-ethyl-palmitamide, and palmitamido-ethyl-oleamide); glycols; polyether polyols (such as Carbowax); acids of aliphatic hydrocarbons (such as adipic acid and sebacic acid); esters of aromatic or aliphatic hydrocarbons (such as glycerol monostearate and pentaerythritol monooleate); styrene-alpha-methyl styrene; fluoro-containing polymers (such as polytetrafluoroethylene, fluorine oils, and fluorine waxes); silicon compounds (such as silanes and silicone polymers, including silicone oils, modified silicones, and cured silicones); sodium alkylsulfates, alkyl phosphoric acid esters; and mixtures thereof. Preferred slip additives are unsaturated fatty acid amides, which are commercially available from Crompton (Kekamide™ grades), Croda Universal (Crodamide™ grades), and Akzo Nobel Amides Co. Ltd. (ARMOSLIP™ grades). Particularly preferred slip agents include unsaturated fatty acid amides having the chemical structure:

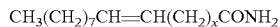

$$CH_3(CH_2)_7CH\!=\!CH(CH_2)_xCONH_2$$

where x is 5 to 15. Preferred versions include: 1) Erucamide, where x is 11, also referred to as cis-13-docosenoamide (commercially available as ARMOSLIP E); 2) Oleylamide, where x is 8; and 3) Oleamide, where x is 7, also referred to as N-9-octadecenyl-hexadecanamide. In another embodiment, stearamide is also useful in this invention. Other preferred slip additives include those described in PCT publication WO 2004/005601A1.

Tackifiers may be blended with the LCB-HDPE compositions of this invention. Examples of useful tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments, the tackifier is hydrogenated. In other embodiments, the tackifier is non-polar. (Here, "non-polar" means that the tackifier is substantially free of monomers having polar groups. Preferably, the polar groups are not present; however, if they are, preferably they are not present at more than 5 wt %, preferably not more than 2 wt %, even more preferably, no more than 0.5 wt %, based upon the weight of the tackifier.) In some embodiments, the tackifier has a softening point (Ring and Ball, as measured by ASTM E-28) of 80° C. to 140° C., preferably 100° C. to 130° C. The tackifier, if present, is typically present at about 1 wt % to about 50 wt %, based upon the weight of the blend, more preferably 10 wt % to 40 wt %, even more preferably 20 wt % to 40 wt %. Preferably, however, tackifier is not present, or if present, is present at less than 10 wt %, preferably less than 5 wt %, more preferably at less than 1 wt %.

Blending and Processing

The polymers suitable for use in the present invention can be in any physical form when used to blend with the modifier of the invention. In one embodiment, reactor granules, defined as the granules of polymer that are isolated from the polymerization reactor prior to any processing procedures, are used to blend with the modifier of the invention. The reactor granules typically have an average diameter of from 50 μm to 10 mm in one embodiment and from 10 μm to 5 mm in another embodiment. In another embodiment, the polymer is in the form of pellets, such as, for example, having an average diameter of from 1 mm to 10 mm that are formed from melt extrusion of the reactor granules.

The components of the present invention can be blended by any suitable means, and are typically blended to yield an intimately mixed composition which may be a homogeneous, single phase mixture. For example, they may be blended in a static mixer, batch mixer, extruder, or a combination thereof, that is sufficient to achieve an adequate dispersion of modifier in the polymer.

The mixing step may involve first dry blending using, for example, a tumble blender, where the polymer and modifier are brought into contact first, without intimate mixing, which may then be followed by melt blending in an extruder. Another method of blending the components is to melt blend the polymer pellets with the modifier directly in an extruder or batch mixer. It may also involve a "master batch" approach, where the final modifier concentration is achieved by combining neat polymer with an appropriate amount of modified polymer that had been previously prepared at a higher modifier concentration. The mixing step may take place as part of a processing method used to fabricate articles, such as in the extruder on an injection molding machine or blown-film line or fiber line.

In a preferred aspect of the invention, the ethylene polymer and modifier are "melt blended" in an apparatus, such as an extruder (single or twin screw) or batch mixer. The ethylene polymer may also be "dry blended" with the modifier using a tumbler, double-cone blender, ribbon blender, or other suitable blender. In yet another embodiment, the ethylene polymer and modifier are blended by a combination of approaches, for example a tumbler followed by an extruder. A preferred method of blending is to include the final stage of blending as part of an article fabrication step, such as in the extruder used to melt and convey the composition for a molding step like injection molding or blow molding. This could include direct injection of the modifier into the extruder, either before or after the polyethylene is fully melted. Extrusion technology for polyethylene is described in more detail in, for example, PLASTICS EXTRUSION TECHNOLOGY 26-37 (Friedhelm Hensen, ed. Hanser Publishers 1988).

In another aspect of the invention, the polyethylene composition may be blended in solution by any suitable means, by using a solvent that dissolves both components to a significant extent. The blending may occur at any temperature or pressure where the modifier and the ethylene polymer remain in solution. Preferred conditions include blending at high temperatures, such as 10° C. or more, preferably 20° C. or more over the melting point of the ethylene polymer. Such solution blending would be particularly useful in processes where the ethylene polymer is made by solution process and the modifier is added directly to the finishing train, rather than added to the dry polymer in another blending step altogether. Such solution blending would also be particularly useful in processes where the ethylene polymer is made in a bulk or high pressure process where both the polymer and the modifier were soluble in the monomer. As with the solution process, the modifier is added directly to the finishing train, rather than added to the dry polymer in another blending step altogether.

Thus, in the cases of fabrication of articles using methods that involve an extruder, such as injection molding or blow molding, any means of combining the polyethylene and modifier to achieve the desired composition serve equally well as fully formulated pre-blended pellets, since the forming process includes a re-melting and mixing of the raw material; example combinations include simple blends of neat polymer pellets and modifier, of neat polymer granules and modifier, of neat polymer pellets and pre-blended pellets, and neat polymer granules and pre-blended pellets. Here, "pre-blended pellets" means pellets of a polyethylene composition comprising ethylene polymer and modifier at some concentration. In the process of compression molding, however, little mixing of the melt components occurs, and pre-blended pellets would be preferred over simple blends of the constituent pellets (or granules) and modifier. Those skilled in the art will be able to determine the appropriate procedure for blending of the polymers to balance the need for intimate mixing of the component ingredients with the desire for process economy.

Fabrication of the articles may be accomplished by injection molding, extrusion, thermoforming, blow molding, rotational molding (rotomolding), fiber spinning, spin bonding or melt blown bonding, such as for non-woven fabrics, film blowing, stretching for oriented films, casting, such as for films (including use of chill rolls), profile deformation, coating (film, wire, and cable), compression molding, calendering, foaming, laminating, transfer molding, cast molding, pultrusion, protrusion, draw reduction, and other common processing methods, or combinations thereof, such as is known in the art and described in, for example, PLASTICS PROCESSING (Radian Corporation, Noyes Data Corp., 1986). Use of at least thermoforming or film applications allows for the possibility of and derivation of benefits from uniaxial or biaxial orientation. Sufficient mixing should take place to assure that an intimately mixed, preferably uniform, blend will be produced prior to conversion into a finished product.

Adhesives

The polymers of this invention or blends thereof can be used as adhesives, either alone or combined with tackifiers. Preferred tackifiers are described above. The tackifier is typically present at about 1 wt % to about 50 wt %, based upon the weight of the blend, more preferably 10 wt % to 40 wt %, even more preferably 20 wt % to 40 wt %. Other additives, as described above, may be added also.

The adhesives of this invention can be used in any adhesive application, including but not limited to, disposables, packaging, laminates, pressure sensitive adhesives, tapes labels, wood binding, paper binding, non-wovens, road marking, reflective coatings, and the like. In a preferred embodiment, the adhesives of this invention can be used for disposable diaper and napkin chassis construction, elastic attachment in disposable goods converting, packaging, labeling, bookbinding, woodworking, and other assembly applications. Particularly, preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Films

The compositions described above and the blends thereof may be formed into monolayer or multilayer films. These films may be formed by any of the conventional techniques known in the art including extrusion, co-extrusion, extrusion coating, lamination, blowing, and casting. The film may be obtained by the flat film or tubular process which may be followed by orientation in a uniaxial direction or in two mutually perpendicular directions in the plane of the film. One or more of the layers of the film may be oriented in the transverse and/or longitudinal directions to the same or different extents. This orientation may occur before or after the individual layers are brought together. Typically the films are oriented in the Machine Direction (MD) at a ratio of up to 15, preferably between 5 and 7, and in the Transverse Direction (TD) at a ratio of up to 15, preferably 7 to 9. However, in another embodiment, the film is oriented to the same extent in both the MD and TD directions.

In multilayer constructions, the other layer(s) may be any layer typically included in multilayer film structures. For example, the other layer or layers may be:

1. Polyolefins. Preferred polyolefins include homopolymers or copolymers of $C_2$ to $C_{40}$ olefins, preferably $C_2$ to $C_{20}$ olefins, preferably a copolymer of an alpha-olefin and another olefin or alpha-olefin (ethylene is defined to be an alpha-olefin for purposes of this invention). Preferably, homopolyethylene, homopolypropylene, propylene copolymerized with ethylene and/or butene, ethylene copolymerized with one or more of propylene, butene or hexene, and optional dienes. Preferred examples include thermoplastic polymers, such as ultra low density polyethylene, very low density polyethylene, linear low density polyethylene, low density polyethylene, medium density polyethylene, high density polyethylene, polypropylene, isotactic polypropylene, highly isotactic polypropylene, syndiotactic polypropylene, random copolymer of propylene and ethylene, and/or butene, and/or hexene, elastomers, such as ethylene propylene rubber, ethylene propylene diene monomer rubber, neoprene, and blends of thermoplastic polymers and elastomers, such as, for example, thermoplastic elastomers and rubber toughened plastics.

2. Polar polymers. Preferred polar polymers include homopolymers and copolymers of esters, amides, acetates, anhydrides, copolymers of a $C_2$ to $C_{20}$ olefin, such as ethylene, and/or propylene, and/or butene with one or more polar monomers, such as acetates, anhydrides, esters, alcohol, and/or acrylics. Preferred examples include polyesters, polyamides, ethylene vinyl acetate copolymers, and polyvinyl chloride.

3. Cationic polymers. Preferred cationic polymers include polymers or copolymers of geminally disubstituted olefins, alpha-heteroatom olefins and/or styrenic monomers. Preferred geminally disubstituted olefins include isobutylene, isopentene, isoheptene, isohexene, isooctene, isodecene, and isododecene. Preferred alpha-heteroatom olefins include vinyl ether and vinyl carbazole, preferred styrenic monomers include styrene, alkyl styrene, para-alkyl styrene, alpha-methyl styrene, chloro-styrene, and bromo-para-methyl styrene. Preferred examples of cationic polymers include butyl rubber, isobutylene copolymerized with para methyl styrene, polystyrene, and poly-alpha-methyl styrene.

4. Miscellaneous. Other preferred layers can be paper, wood, cardboard, metal, metal foils (such as aluminum foil and tin foil), metallized surfaces, glass (including silicon oxide ($SiO_x$) coatings applied by evaporating silicon oxide onto a film surface), fabric, spunbonded fibers, and non-wovens (particularly, polypropylene spunbonded fibers or non-wovens), and substrates coated with inks, dyes, pigments, and the like.

The films may vary in thickness depending on the intended application; however, films of a thickness from 1 µm to 250 µm are usually suitable. Films intended for packaging are usually from 10 to 60 micron thick. The thickness of the sealing layer is typically 0.2 µm to 50 µm. There may be a sealing layer on both the inner and outer surfaces of the film or the sealing layer may be present on only the inner or the outer surface.

Additives, such as block, antiblock, antioxidants, pigments, fillers, processing aids, UV stabilizers, neutralizers, lubricants, surfactants, and/or nucleating agents may also be present in one or more than one layer in the films. Preferred additives include silicon dioxide, titanium dioxide, polydimethylsiloxane, talc, dyes, wax, calcium sterate, carbon black, low molecular weight resins, and glass beads, preferably these additives are present at from 0.1 ppm to 1000 ppm.

In another embodiment, one more layer may be modified by corona treatment, electron beam irradiation, gamma irradiation, or microwave irradiation. In a preferred embodiment, one or both of the surface layers is modified by corona treatment.

The films described herein may also comprise from 5 wt % to 60 wt %, based upon the weight of the polymer and the resin, of a hydrocarbon resin. The resin may be combined with the polymer of the seal layer(s) or may be combined with the polymer in the core layer(s). The resin preferably has a softening point above 100° C., even more preferably from 130° C. to 180° C. Preferred hydrocarbon resins include those described above. The films comprising a hydrocarbon resin may be oriented in uniaxial or biaxial directions to the same or different degrees.

The films described above may be used as stretch and/or cling films. Stretch/cling films are used in various bundling, packaging, and palletizing operations. To impart cling properties to, or improve the cling properties of, a particular film, a number of well-known tackifying additives have been utilized. Common tackifying additives include polybutenes, terpene resins, alkali metal stearates, hydrogenated rosins, and rosin esters. The cling properties of a film can also be modified by the well-known physical process referred to as corona discharge. Some polymers (such as ethylene methyl acrylate copolymers) do not need cling additives and can be used as cling layers without tackifiers. Stretch/cling films may comprise a slip layer comprising any suitable polyolefin or combination of polyolefins, such as polyethylene, polypropylene, copolymers of ethylene and propylene, and polymers obtained from ethylene and/or propylene copolymerized with minor amounts of other olefins, particularly $C_4$ to $C_{12}$ olefins. Particularly, preferred is linear low density polyethylene (LLDPE). Additionally, the slip layer may include one or more anti-cling (slip and/or antiblock) additives which may be added during the production of the polyolefin or subsequently blended in to improve the slip properties of this layer. Such additives are well-known in the art and include, for example, silicas, silicates, diatomaceous earths, talcs, and various lubricants. These additives are preferably utilized in amounts ranging from about 100 ppm to about 20,000 ppm, more preferably between about 500 ppm to about 10,000 ppm, by weight based upon the weight of the slip layer. The slip layer may, if desired, also include one or more other additives, as described above.

Molded and Extruded Products

The LCB-HDPE composition described above may also be used to prepare molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art.

The compositions described herein may be shaped into desirable end use articles by any suitable means known in the art. Thermoforming, vacuum forming, blow molding, rotational molding, slush molding, transfer molding, wet lay-up or contact molding, cast molding, cold forming matched-die molding, injection molding, spray techniques, profile co-extrusion, or combinations thereof are typically used methods.

Thermoforming is a process of forming at least one pliable plastic sheet into a desired shape. An embodiment of a thermoforming sequence is described; however, this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which preheats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool. Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness. For a semicrystalline polymer, fast plug speeds generally provide the best material distribution in the part. The shaped laminate is then cooled in the mold. Sufficient cooling to maintain a mold temperature of 30° C. to 65° C. is desirable. The part is below 90° C. to 100° C. before ejection in one embodiment. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, Concise Encyclopedia of Polymer Science and Engineering (Jacqueline I. Kroschwitz, ed., John Wiley & Sons, 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 180° C. and 300° C. in one embodiment, and from 200° C. and 250° C. in another embodiment, and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,000 kPa to 15,000 kPa. The mold is cooled between 10° C. and 70° C. to cool the substrate. The temperature will depend on the desired gloss and appearance desired. Typical cooling time is from 10 to 30 seconds, depending in part on the thickness. Finally, the mold is opened and the shaped composite article ejected.

Likewise, molded articles may be fabricated by injecting molten polymer blend into a mold that shapes and solidifies the molten polymer into desirable geometry and thickness of molded articles. A sheet may be made either by extruding a substantially flat profile from a die, onto a chill roll, or alternatively by calendering. Sheets will generally be considered to have a thickness of from 10 mils to 100 mils (254 microns to 2540 microns), although sheets may be substantially thicker. Tubing or pipe may be obtained by profile extrusion for uses in medical, potable water, land drainage applications, or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 microns to 0.5 cm. The pipe will generally be in the range of from 2.54 cm to 254 cm in outside diameter, and have a wall thickness of in the range of from 0.5 cm to 15 cm. Sheets made from the products of an embodiment of a version of the present invention may be used to form containers. Such containers may be formed by thermoforming, solid phase pressure forming, stamping, and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 μm to 6000 μm in one embodiment, from 200 μm to 6000 μm in another embodiment, from 250 μm to 3000 μm in yet another embodiment, and from 500 μm to 1550 μm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 190° C. and 255° C. in one embodiment, and between 210° C. and 250° C. in another embodiment, the fill time from 2 to 10 seconds in one embodiment, from 2 to 8 seconds in another embodiment, and a tool temperature of from 25° C. to 65° C. in one embodiment and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles, such as fuel tanks and other fluid containers, playground equipment, outdoor furniture, and small enclosed structures.

It will be understood by those skilled in the art that the steps outlined above may be varied, depending upon the desired result. For example, the extruded sheet of the compositions of this invention may be directly thermoformed or blow molded without cooling, thus skipping a cooling step. Other parameters may be varied as well in order to achieve a finished composite article having desirable features.

This invention further relates to:

1. A long chain branched high density ethylene polymer having:
at least 50 mol % ethylene;
a density of from 0.950 to 0.96 g/cm$^3$ (from greater than 0.955 to 0.96 g/cm$^3$);
an Mw/Mn of 4.5 or less (preferably below 4.0);
a melt index (190° C., 2.16 kg) of 5 dg/min or less;
an Mw of 50,000 or more (preferably from about 1,000 to about 1,250,000 g/mol, preferably between about 6,000 and about 134,000, alternately from 50,000 to about 1,250,000 g/mol);
a g'$_{(Zave)}$ of 0.975 or less;
high load melt index (190° C., 21.6 kg) of 1.0 dg/min or more; and
wherein polyethylene having an Mw of 1000 or less are present at less than 5 wt %, based upon the weight of the polyethylene polymer, (preferably polyethylene having an Mw of 1000 g/mol or less are not detected by DRI GPC).

2. The ethylene polymer of paragraph 1, wherein both g' and MIR increase with ave) (z molecular weight distribution.

3. The ethylene polymer of paragraph 1 or 2, wherein the polymer has less than 0.08 vinyl groups per 1000 carbons and/or less than 0.4 vinylene groups per 1000 carbons.

4. The ethylene polymer of paragraph 1, 2, or 3, wherein the polymer has a gel stiffness of more than 10,000 Pa*s$^n$.

5. The ethylene polymer of paragraph 1, 2, 3, or 4, wherein the polymer has a relaxation exponent, n, between 0.35 and 0.85.

6. The ethylene polymer of any of paragraphs 1 to 5, wherein the polymer has a Tm (° C.) of 125° C. or more (preferably 130° C. or more).

7. The ethylene polymer of any of paragraphs 1 to 6, wherein the polymer has an Mz of 150,000 g/mol or more.

8. The ethylene polymer of any of paragraphs 1 to 7, wherein the polymer has an MIR of 30 or more.

9. The ethylene polymer of any of paragraphs 1 to 8, wherein the polymer comprises 3 mol % or less of comonomer, preferably 2 mol % or less, preferably 1 mol % or less, preferably 0 mol %.

10. A polymerization process to prepare a long chain branched high density ethylene polymer (preferably the polymer of any of paragraphs 1 to 8) comprising:
1) combining at a temperature of 70° C. to 100° C. and a reactor pressure of 230 psig and about 330 psig: 1) ethylene, where the ethylene is present in the reactor at about 45 to 90 psi, preferably about 50 psi and about 90 psi; 2) optional comonomer, 3) a catalyst system comprising metallocene catalyst compound, an activator, optional co-activator, and an optional support, wherein the catalyst compound is represented by the formula: $(Cp^A)(Cp^B)MX_2$ or $T(Cp^A)(Cp^B)MX_2$;
where M is Hf or Zr, each X is, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system); T is represented by the formula $R_2{}^aL$, where L is C, Si, or Ge, and each $R^a$ is, independently, hydrogen, halogen, $C_1$ to $C_{20}$ hydrocarbyl or a $C_1$ to $C_{20}$ substituted hydrocarbyl, and two $R^a$ can form a cyclic structure including aromatic, partially saturated, or saturated cyclic or fused ring system (preferably, T is a bridging group comprising carbon or silica, such as dialkylsilyl; $Cp^A$ and $Cp^B$ are substituted or unsubstituted indenyl groups;
2) obtaining long chain branched high density polyethylene polymer, wherein the polymer has:
at least 50 mol % ethylene;
a density of from 0.950 to 0.96 g/cm$^3$;
an Mw/Mn of 4.5 or less;
a melt index (190° C., 2.16 kg) of 5 dg/min or less;
an Mw of 50,000 or more;
a $g'_{(Zave)}$ of 0.975 or less; and
high load melt index (190° C., 21.6 kg) of 1.0 dg/min or more; and
wherein polyethylene having an Mw of 1000 or less are present at less than 5 wt %, based upon the weight of the polyethylene polymer.
11. The process of paragraph 9, wherein the activator is an alumoxane.
12. The process of paragraph 10 or 11, wherein M is Hf or Zr, each X is, independently, selected from the group consisting of Cl, Br, I, and $C_1$ to $C_{12}$ alkyls, T is selected from $CH_2$, $CH_2CH_2$, $C(CH_3)_2$, $SiMe_2$, $SiPh_2$, $SiMePh$, silylcyclobutyl $(Si(CH_2)_3)$, $(Ph)_2C$, $(p\text{-}(Et)_3SiPh)_2C$, and silylcyclopentyl $(Si(CH_2)_4)$); and $Cp^A$ and $Cp^B$ are tetrahydroindenyl groups, where Me is methyl, Ph is phenyl, and Et is ethyl.
13. The process of paragraph 10, 11, or 12 wherein $Cp^A$ and $Cp^B$ are bridged by T and at least one of $Cp^A$ and $Cp^B$ is a substituted π-bound cyclopentadienyl moiety.
14. The process of paragraph 10, 11, 12, or 13 wherein $Cp^A$ and $Cp^B$ are bridged by T and both of $Cp^A$ and $Cp^B$ are, independently, a substituted π-bound cyclopentadienyl moiety.
15. The process of paragraph 10, 11, 12, 13, or 14 wherein the catalyst compound produces vinyl termination.

Experimental

Materials

HD9856B is a high density polyethylene having a reported melt index of about 0.46 g/10 min and a density of 0.957 g/cc available from ExxonMobil Chemical Company, Houston, Tex.

HYA021L is a high density polyethylene having a reported melt index of less than 0.1 g/10 min, a high load melt index of 5.0 g/10 min and a density of about 0.954 g/cc available from ExxonMobil Chemical Company, Houston, Tex.

Test Methods

Melting point (Tm) was determined by differential scanning calorimetry (DSC). This analysis was conducted using either a TA Instruments MDSC 2920 or a Perkin Elmer DSC7. Typically, 6 to 10 mg of molded polymer or modified polyethylene composition was sealed in an aluminum pan and loaded into the instrument at room temperature. Melting data (first heat) were acquired by heating the sample to at least 30° C. above its melting temperature at a heating rate of 20° C./min. This provides information on the melting behavior under as-molded conditions, which can be influenced by thermal history as well as any molded-in orientation or stresses. The sample was then held for 5 minutes at this temperature to destroy its thermal history. Crystallization data was acquired by cooling the sample from the melt to −20° C. at a cooling rate of 10° C./min. The sample was then held at −20° C. for 5 minutes, and finally heated at 10° C./min to acquire additional melting data (second heat). This provides information about the melting behavior after a controlled thermal history and free from potential molded-in orientation and stress effects. The endothermic melting transition (first and second heat) and exothermic crystallization transition were analyzed for onset of transition and peak temperature. The melting temperatures reported in the table below are the peak melting temperatures from the second heat unless otherwise indicated. For polymers displaying multiple peaks, the higher melting peak temperature is reported.

Molecular weight (Mw, Mn, Mz), and molecular weight distribution (Mw/Mn) were determined by Gel Permeation Chromatography (Size Exclusion Chromatography)-DRI as described in the Test Methods section, paragraph [0334] to [0341], page 24-25, including the references cited therein, of U.S. Application Publication No. 2006/0173123 except that: 1) a PLgel, mixed B column, 7.5 mm×300 mm was used with the molecular weight range is listed as 500 g/mol to 10M g/mol; 2) the mobile phase was 1.5 mg/ml BHT in 1,2,4 trichlorobenzene; 3) the stationary phase was polystyrene-divinyl benzene shaped as 10 micron beads; 4) the flow rate of the mobile phase was 1 ml/min; 5) the run temperature was 160° C.; 6) the various transfer lines, columns and differential refractometer (the DRI detector) are contained in an oven maintained at 145° C.; 7) the TCB densities used to express the polymer concentration in mass/volume units are 1.463 g/ml at room temperature and 1.284 at 145° C.; 8) prior to running each sample the DRI detector and the injector were purged; and 9), the flow rate in the apparatus was then increased to 0.5 ml/minute, and the DRI allowed to stabilize for 8 to 9 hours at least before injecting the first sample.

Viscosity average branching index, ($g'_{(vis\ ave)}$) was determined by the formula for g' as mentioned in U.S. Application Publication No. 2006/0173123 (paragraph [0340]), except the Mark-Houwink parameter k=0.0000579.

Density was measured according to ASTM D 1505.

Melt Index (MI), I2, high load melt index, (HLMI), I21, Melt Index Ratio (MIR-I21/I2) were measured according to ASTM D 1238, (190° C., 2.16 kg for MI and 21.6 kg for HLMI).

Intrinsic viscosity was determined as described in the Test Methods section, paragraph [0334] to [0341], page 24-25 of U.S. Application Publication No. 2006/0173123, including the references cited therein, except that the GPC procedure was run as described above.

Z average branching index ($g'_{(Z\ ave)}$) was determined using data generated using the SEC-DRI-LS-VIS procedure described in the Test Methods section, paragraph [0334] to [0341], page 24-25 of U.S. Application Publication No. 2006/0173123 (including the references cited therein, except that the GPC procedure was run as described above), where $$g'_{Zave} = \frac{\sum C_i [\eta_i]_b}{\sum C_i KM_i^\alpha}$$

where $[\eta_i]_b$ is the viscosity of the polymer in slice i of the polymer peak, and $M_i$ is the weight averaged molecular weight in slice i of the polymer peak measured by light scattering, K and α are the parameters for linear polyethylene (K=0.0000579 and α=0.695), $C_i$=polymer concentration in the slice i in the polymer peak times the mass of the slice squared, $M_i^2$.

Viscosity average molecular weight (Mv) was determined by LS analysis as described in the Test Methods section, paragraph [0334] to [0341], page 24-25 of U.S. Application Publication No. 2006/0173123, including the references cited therein, except that the GPC procedure was run as described above.

Carbon-13 NMR data was collected at 120° C. in a 10 mm probe using a Varian spectrometer with a $^{13}$Carbon frequency of 100 MHz. A 90 degree pulse, an acquisition time adjusted to give a digital resolution between 0.1 Hz and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 wt % to 15 wt % prior to being inserted into the spectrometer magnet.

$^1$HNMR data was collected at 120° C. in a 5 mm probe using a Varian spectrometer with a $^1$Hydrogen frequency of at least 500 MHz. Data was recorded using a maximum pulse width of 45°, 8 seconds between pulses and signal averaging 120 transients. Vinyl content (group/1000), vinylene content (group/1000), and long chain branching content (group/1000) are determined by $^1$HNMR.

Gel Stiffness and relaxation exponent n: In a plot of the phase angle δ versus the measurement frequency ω, polymers that have long chain branches exhibit a plateau in the function of δ(ω) whereas linear polymers do not have such a plateau. The phase angle δ is the arctan(G"/G') wherein G" represents the loss modulus (Pa) and G' represents the storage modulus (Pa). According to Garcia-Franco et al. (Macromolecules, 2001, 34, No. 10, 3115-3117), the plateau in the aforementioned plot will shift to lower phase angles δ when the amount of LCBs occurring in the polymer sample increases. Dividing the phase angle at which the plateau occurs by a phase angle of 90°, one obtains the critical relaxation exponent, n, which can then be used to calculate a gel stiffness using the equation:

$$\eta^*(\omega) = S\Gamma(1-n)\omega^{n-1}$$

wherein η* represents the complex viscosity (Pa*s), ω represents the frequency, S is the gel stiffness, Γ is the gamma function (see Beyer, W. H. Ed., CRC Handbook of Mathematical Sciences 5th Ed., CRC Press, Boca Rotan, 1978) and n is the critical relaxation exponent. Unless otherwise stated, the gel stiffness is determined at the test temperature of 190° C. Generally, the plot of the phase angle δ versus the measurement frequency ω is generated with data obtained using a Small Amplitude Oscillatory Shear test performed on a dynamic (oscillatory) rheometers such as Anton Parr Physica MCR500 or MCR501. Typically, the polymer specimen is compression molded to a wafer of approximately 25 mm diameter and thickness between 1.5 mm to 2 mm and the sample is stabilized with commercially available materials (such as Irganox™ 1076, Irganox™ 168, and or polyethylene glycol) to prevent thermally induced chemical changes. Generally, the dynamic rheometer is used in the dynamic mode (as opposed to steady state mode) using the parallel plates geometry, at a constant temperature of 190° C., letting the angular frequency vary from 0.01 rad/s to 100 rad/s. Linear response of the tested polymer melt should be ensured by using small amplitudes chosen from previous amplitude scans of the linear region of the sample.

Rheology method A: G" (loss modulus), G' (storage modulus), complex viscosity, phase angle and complex modulus were determined as follows:

The procedure detailed above and that detailed in Robertson, C. G., García-Franco, C. A. and Srinivas, S. (2004), "Extent of Branching From Linear Viscoelasticity of Long-Chain-Branched Polymers," Journal of Polymer Science Part B: Polymer Physics, 42, pp. 1671-1684, is used, expect as modified below: small amplitude oscillatory shear and transient uniaxial extensional stress growth experiments were performed at several temperatures with a Paar Physica dynamic rheometer and a Sentmanat Extensional Rheometer-2 (SER-2)-instrument hosted by the ARES 2001 rheometer. Both test types used a 25-mm parallel plate geometry with about 1 mm gap. Small-strain oscillatory shear tests were conducted at temperatures of 150° C., 190° C., 200° C., and 220° C. with frequency sweeps from 0.01 rad/s to 250 rad/s. The strain used during the frequency sweeps at constant temperature was modified within the range from 2% to 10% to maintain adequate sample torque response while ensuring that the measurements were within the linear viscoelastic region as verified by strain sweeps. Creep testing was performed at 190° C. with a shear stress of 50 Pa, which yielded effective shear rates between 4E-3 $s^{-1}$ and 2E-4 $s^{-1}$, depending on the compliance of the sample. The zero shear viscosity of each sample was determined from the creep data in the region where steady-state flow was developed, that is, when a plot of log(compliance) versus log(time) achieved a slope of unity. Limited sets of oscillatory shear data were collected in constant stress mode before and after a lengthy creep test. These were compared to verify the thermal stability of the sample.

The Uniaxial Transient Extensional Viscosity was measured at 150° C. and 190° C., with the Sentmanat Extensional Rheometer (SER-1) hosted by the ARES-2001 dynamic rheometer. These transient extensional viscosities were measured at two strain rates, namely 1 $s^{-1}$ and 10 $s^{-1}$. The linear viscoelastic envelope was also measured at both temperatures.

Polymerizations

The polymerizations were conducted in a two liter slurry phase autoclave reactor. Polymerization conditions (ethylene pressure, temperature, and yield) and polymer properties are summarized in Tables 1 and 2. For all polymerization examples, 1000 mL of isobutane was charged into the reactor as diluent, followed by charging ethylene at a set pressure (indicated in Table 1) and 1 ml of 1M triisobutyl aluminum in hexane solution. Typically, about 100 mg of catalyst/activator (dimethylsilylbis(tetrahydroindenyl)zirconium dichloride and methyl alumoxane supported on silica—0.35 wt % Zr, 100 to 140 molar ratio of Zr/Al, 10-12 wt % of aluminum) was charged and the reactor temperature was raised from room temperature to the target run temperature. Reactor pressure was maintained between 280 psig to 330 psig (1.93 MPa and 2.28 MPa). All polymerizations were performed for 60 minutes counting from the start of the ethylene uptake flow.

TABLE 1

Reactions summary on ethylene polymerizations.

| Example HDPE- | Catalyst (mg) | Ethylene pressure (psi // MPa) | Polym T (°C.) | Yield (g) | MI (I2, dg/min) | HLMI (I21, dg/min) | MIR (I21/I2) | Tm (°C.) | Density (g/cc) | Activity (g/g cat/hr) |
|---|---|---|---|---|---|---|---|---|---|---|
| 1 | 101.5 | 80 // 0.55 | 90 | 96.3 | | 3.63 | | 135.87 | | 948.8 |
| 2 | 104 | 80 // 0.55 | 90 | 81.7 | | 4.65 | | 135.72 | 0.9509 | 785.6 |
| 3 | 106.7 | 60 // 0.41 | 90 | 40.2 | | | | 134.68 | 0.9538 | 376.8 |
| 4* | 101.9 | 60 // 0.41 | 90 | 32.8 | 0.26 | 16.57 | 64.73 | 134.79 | | 321.9 |
| 5 | 109.3 | 70 // 0.48 | 90 | 42.7 | | | | 134.61 | 0.9538 | 390.7 |
| 6* | 103.8 | 70 // 0.48 | 90 | 43.2 | 0.17 | 11.97 | 71.27 | 134.73 | | 416.2 |
| 7 | 103.6 | 80 // 0.55 | 70 | 29.7 | | 2.16 | | 135.50 | | 286.7 |
| 8 | 103.3 | 80 // 0.55 | 80 | 38.4 | | 4.19 | | 135.20 | | 371.7 |
| 9 | 102.3 | 80 // 0.55 | 80 | 34.5 | | 5.33 | | 135.17 | | 337.2 |
| 10 | 102.9 | 40 // 0.28 | 100 | 10.8 | | 218.93 | | 132.03 | | 105.0 |
| 11* | 101.4 | 40 // 0.28 | 100 | 11.3 | 8.48 | | | 131.86 | | 111.4 |
| 12 | 100.3 | 50 // 0.34 | 100 | 19.9 | 2.73 | 106.30 | 38.99 | 131.68 | 0.9585 | 198.4 |
| 13 | 98.2 | 60 // 0.41 | 100 | 20.5 | 3.45 | 108.35 | 31.43 | 131.46 | 0.9584 | 208.8 |
| 14 | 103.7 | 70 // 0.48 | 100 | 50.4 | 0.63 | 30.74 | 48.40 | 133.12 | | 486.0 |

Runs with * are the replicates of the immediately preceding example.

TABLE 2

| Polymer from Example | Mn (g/mol) GPC-DRI | Mw (g/mol) GPC-DRI | Mz (g/mol) GPC-DRI | Mw/Mn GPC-DRI | g'$_{(vis\ ave)}$ | g'$_{(z\ ave)}$ | MIR (I21/I2) |
|---|---|---|---|---|---|---|---|
| 3 | 35897 | 133508 | 345755 | 3.72 | 0.969 | 0.925 | |
| 4 | 33814 | 133530 | 377716 | 3.95 | 0.962 | 0.908 | 64.73 |
| 12 | 17811 | 68945 | 195492 | 3.87 | 0.952 | 0.89 | 38.99 |
| 13 | 21529 | 70572 | 192875 | 3.28 | 0.939 | 0.865 | 31.43 |
| 14 | 27121 | 106257 | 299402 | 3.92 | 0.97 | 0.906 | 48.40 |

MIR determined according to ASTM 1238.

MIR and g'$_{(Z\ ave)}$ can be used as indicator of processability and complexity of LCB. Normally, as the long chain branching complexity increases, the MIR will increase and the g' will decrease since greater hydrodynamic volume compression will occur. However, for the samples described herein, it is interesting to observe that g' increases with MIR.

$^1$H NMR of samples prepared herein suggests that a significant fraction of the LCB-HDPE is not vinyl terminated.

TABLE 3

NMR results for vinyl termination of samples

| | Double Bonds per 1000 Carbons | |
|---|---|---|
| Sample | Vinyl (group/1000) | Vinylene (group/1000) |
| 3 | 0.03 | 0.21 |
| 4 | 0.07 | 0.25 |
| 5 | 0.01 | 0.29 |
| 6* | 0.06 | 0.36 |

Figure 2:
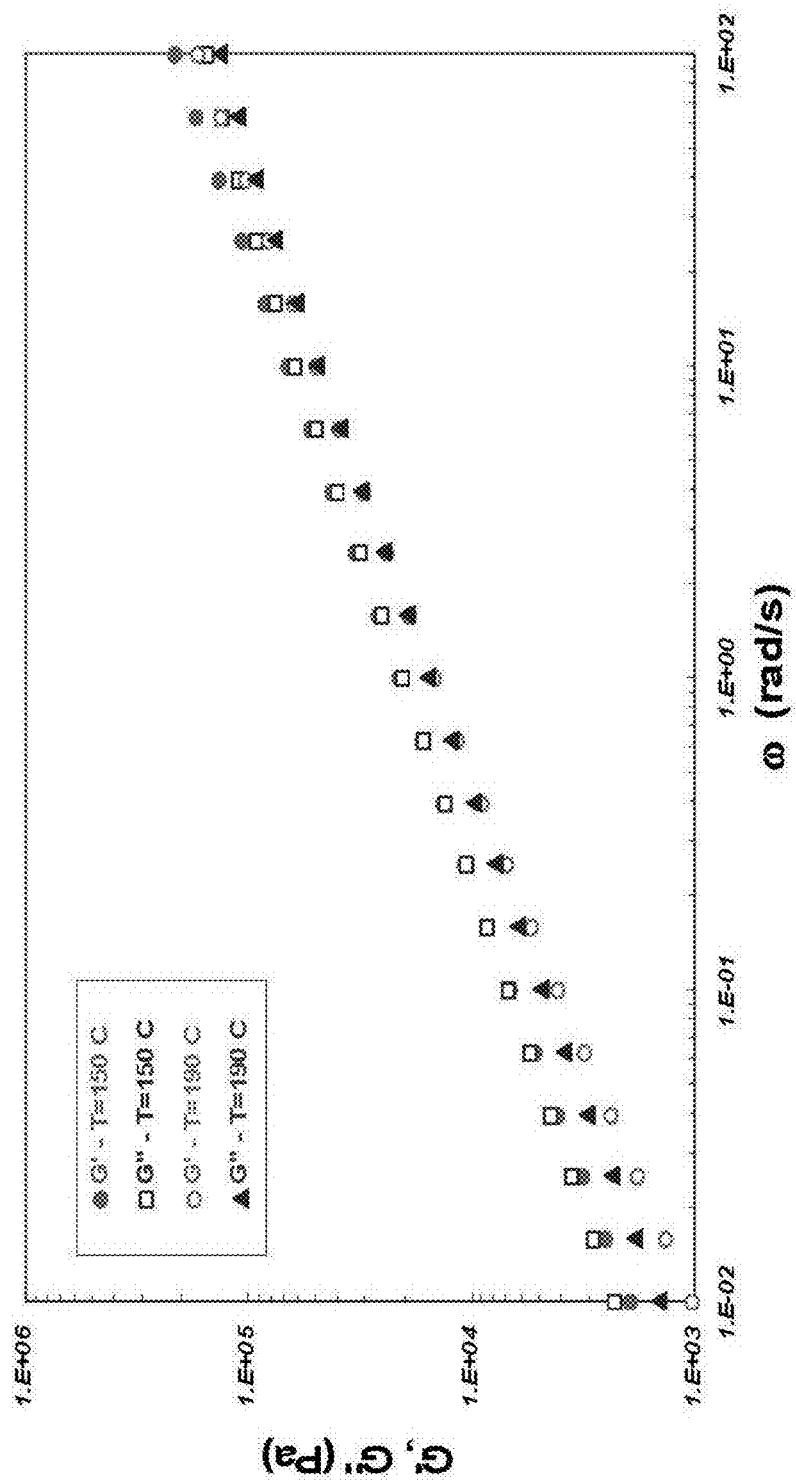
FIG. 2 provides dynamic moduli of Example 3 at 150° C. and 190° C.

FIG. 2 depicts G' and G" of LCB-HDPE sample 3 at 150° C. and 190° C. Note that G' and G" scale with the same power of frequency at both temperatures. This is indicative of the presence of long chain branching (Macromolecules, 2001, 34, No. 10, 3115-3117).

Figure 3:
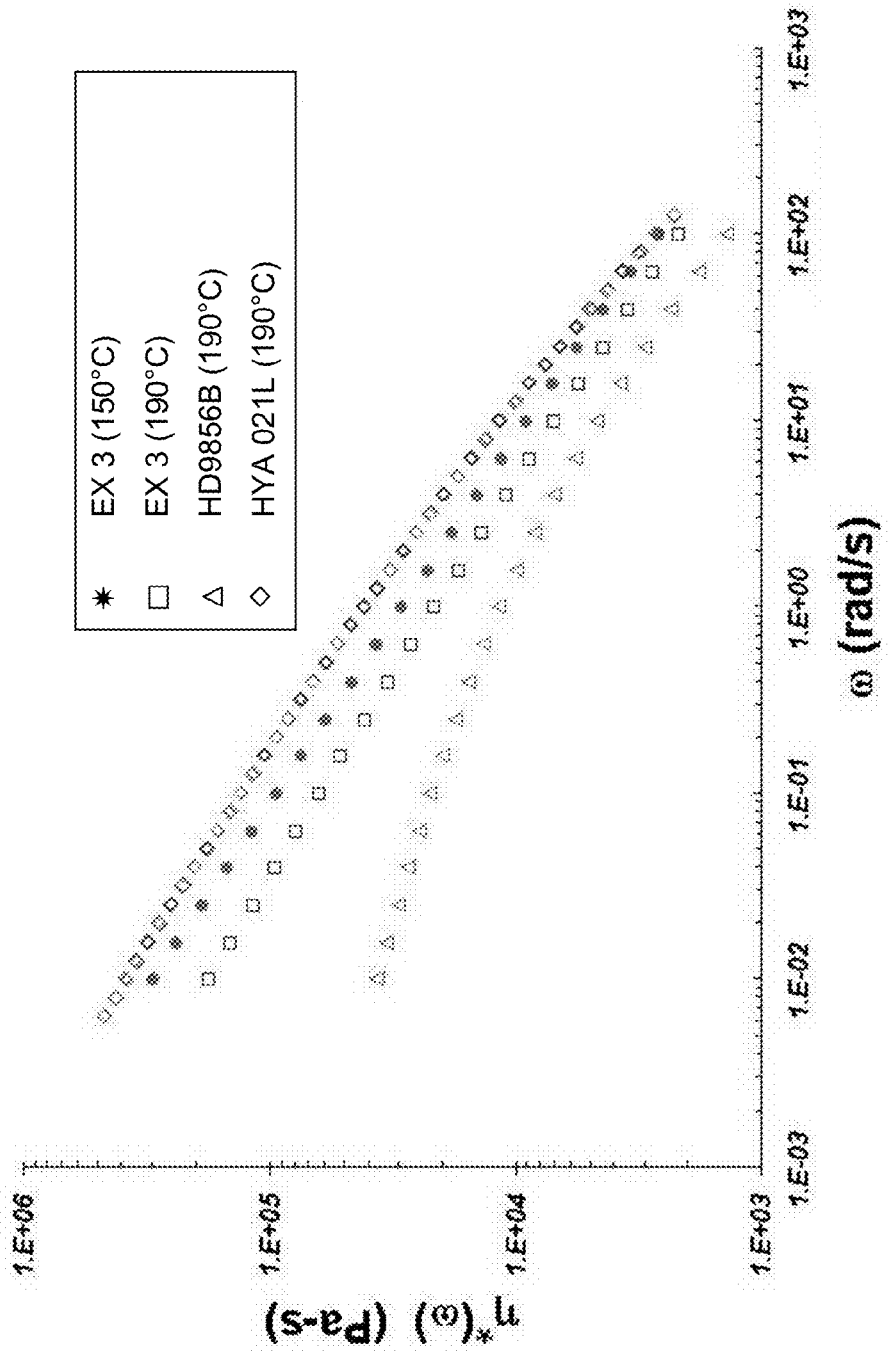
FIG. 3 depicts complex viscosity of Example 3 (at 150° C. and 190° C.), HD9856B, and HYA021L, as a function of frequency.

FIG. 3 shows the complex viscosity of LCB-HDPE-3 as a function of frequency and compares it with that of the HD9856B and HYA021L.

Figure 4:
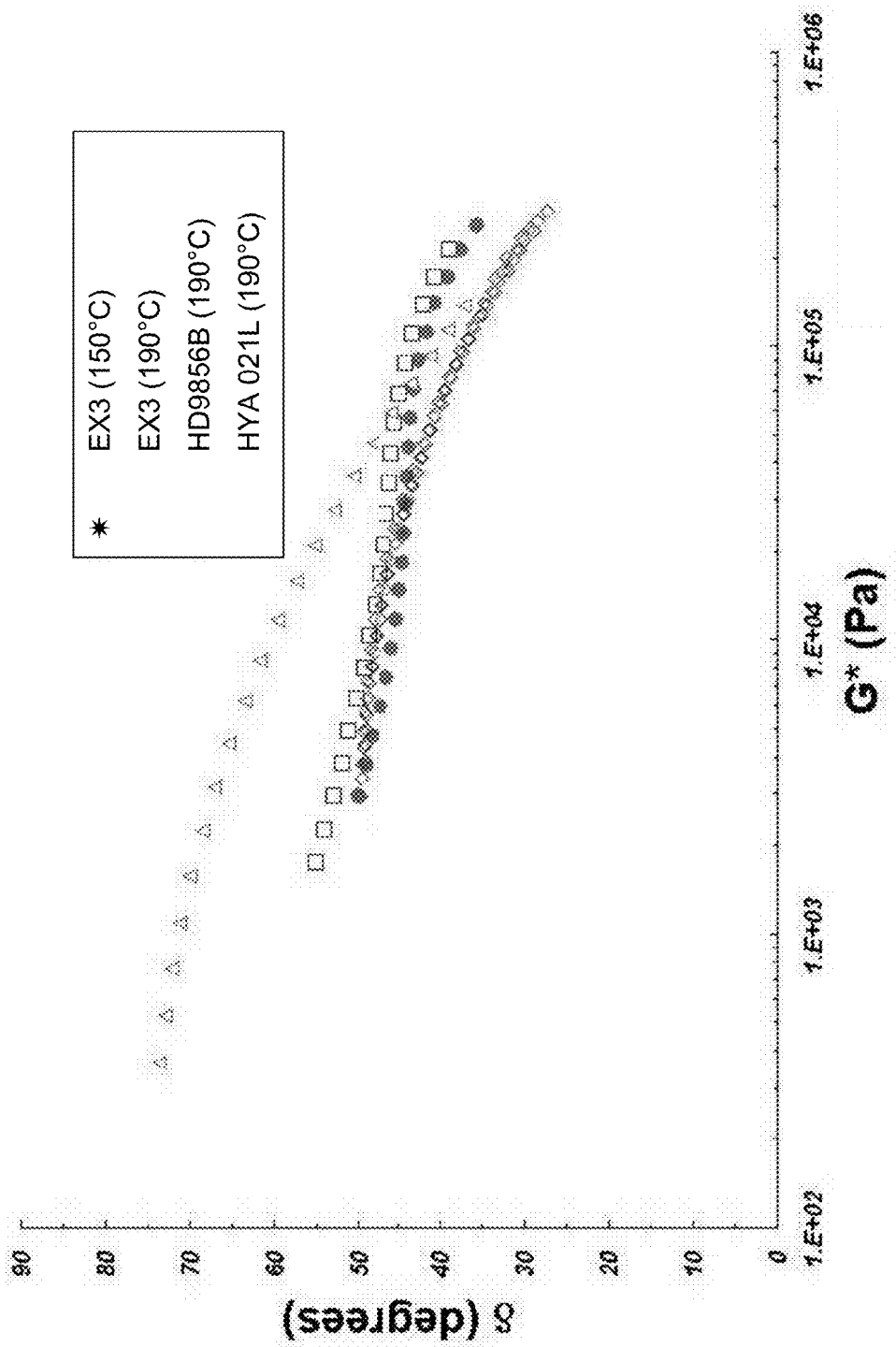
FIG. 4 is a Van Gurp-Palmen plot of HDPE polymers: Example 3 (at 150° C. and 190° C.), HD9856B, and HYA 021L.

An efficient way of assessing elastic characteristics of well entangled polymer melts is provided by a Van Gurp-Palmen plot, whereby the phase angle is plotted against the absolute value of the complex modulus on semi-log coordinates. This representation of the linear viscoelastic properties is molecular weight and temperature invariant; however, it is very sensitive to the Mw/Mn and the presence of branching. FIG. 4 is a Van Gurp-Palmen plot of Example 3, HD9856B, and HYA021L.

Using the equation $\eta^*(\omega)=S\Gamma(1-n)\omega^{n-1}$, with data generated from Rheology method A, gel stiffness, S, and relaxation exponent, n, of sample 3 at 150° C. and 190° C. were calculated.

| T (°C.) | n | S (Pa-s$^n$) |
|---|---|---|
| 150 | 0.494 | 16,500 |
| 190 | 0.522 | 11,500 |

The values of the parameters n & S of the Gel-like behavior exhibited by these LCB polymers suggest that this LCB mHDPE will be commercially attractive in blow molding and blown film applications both alone and in blends with other polymers, such as other HDPEs, LLDPEs, and the like.

Figure 5:
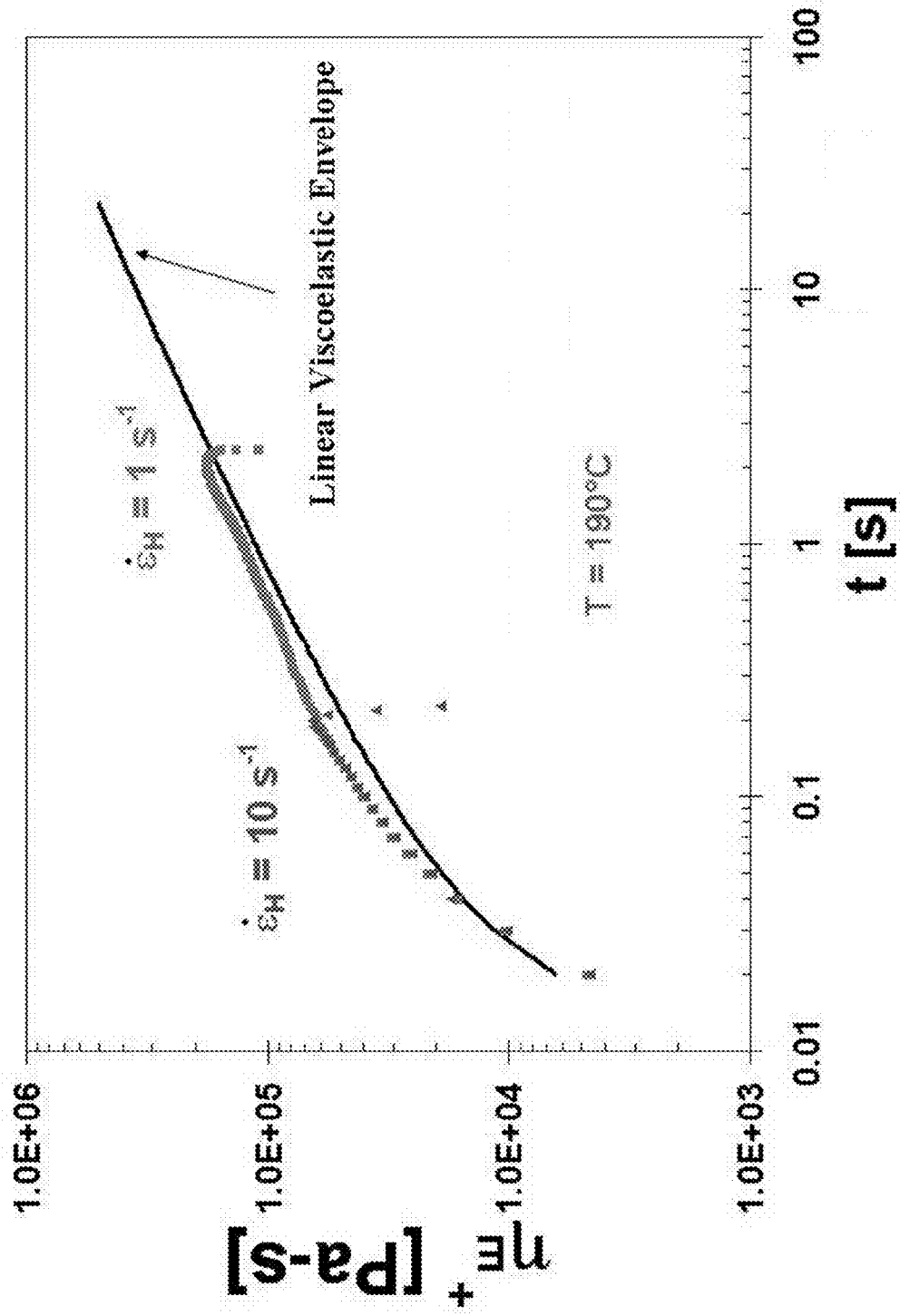
FIG. 5 provides the uniaxial transient extensional viscosity of Example 3 at 190° C.
Figure 6:
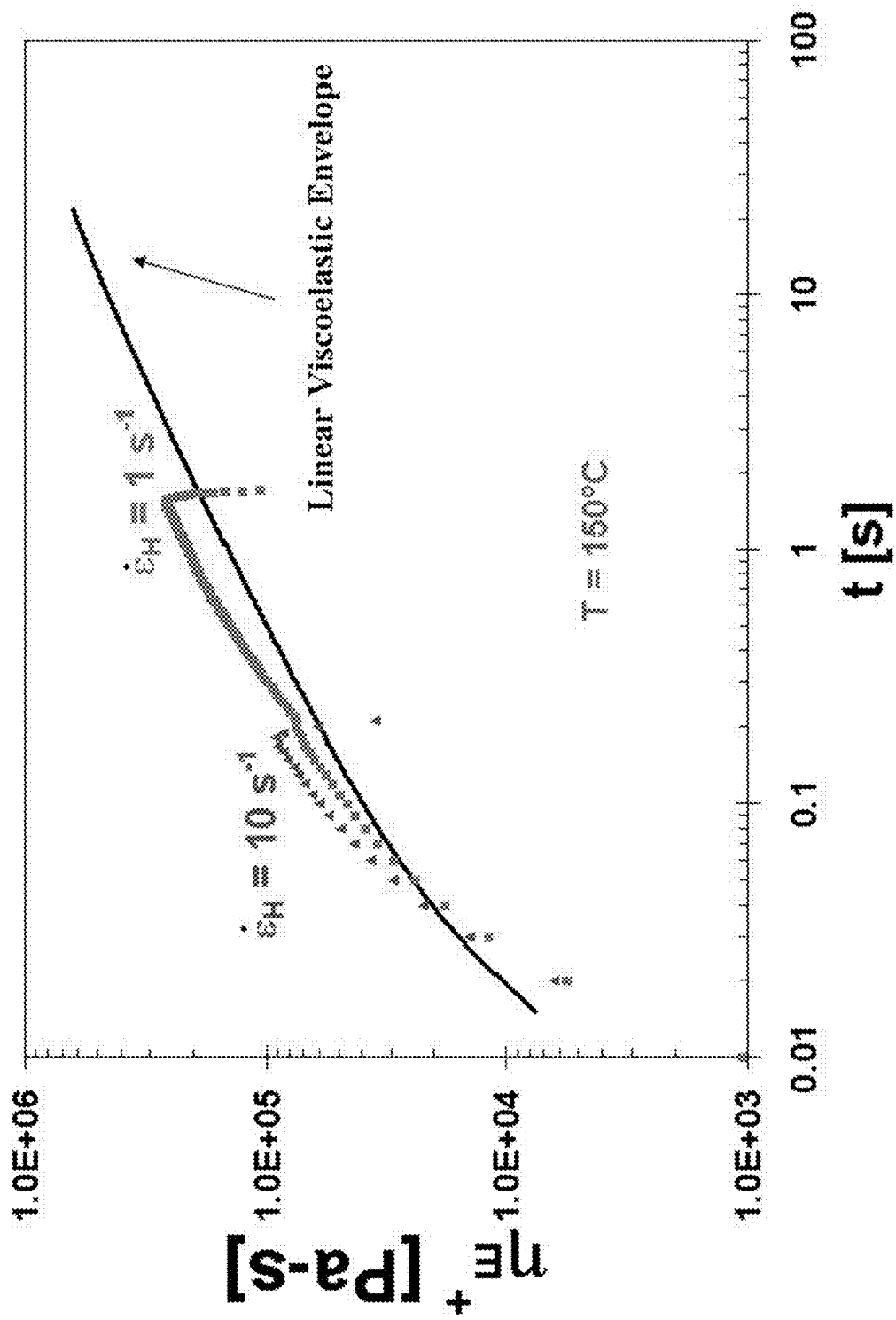
FIG. 6 provides the uniaxial transient extensional viscosity of Example 3 at 150° C.

FIGS. 5 and 6 show Uniaxial Transient Extensional Viscosity ($\eta E^+$) versus time indicating of Example LCB-HDPE 3. It is rather striking, that this material which, as the Van Gurp-Palmen plot indicates, contains long chain branching; does not show strain hardening (or thickening) in the uniaxial transient extensional viscosity experiments.

All documents described herein are incorporated by reference herein for purposes of all jurisdictions where such practice is allowed, including any priority documents, related applications, and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "is" preceding the recitation of the composition, element, or elements and vice versa.

What is claimed is:

1. A long chain branched high density ethylene polymer having:
    at least 95 mol % ethylene;
    a density of from 0.950 g/cm$^3$ to 0.96 g/cm$^3$;
    an Mw/Mn of 4.5 or less;
    a melt index (190° C., 2.16 kg) of 5 dg/min or less;
    an Mw within a range of from 68,945 to 133,530;
    a g'$_{(Zave)}$ within a range of from 0.89 to 0.925;
    high load melt index (190° C., 21.6 kg) within a range of from 2.16 to 108.35 dg/min;
    a melt index ratio (MIR) within a range of from 31.43 to 64.73; and
    wherein polyethylene having an Mw of 1000 or less are present at less than 5 wt %, based upon the weight of the polyethylene polymer;
    and produced by a method of combining ethylene and a bridged or unbridged bis-indenyl or bis-tetrahydroindenyl metallocene catalyst compound.

2. The ethylene polymer of claim 1, wherein polyethylene having an Mw of 1000 g/mol or less are not detected by DRI GPC.

3. The ethylene polymer of claim 1, wherein both g'$_{(Zave)}$ and MIR increase with molecular weight distribution.

4. The ethylene polymer of claim 1, wherein the polymer has less than 0.08 vinyl groups per 1000 carbons.

5. The ethylene polymer of claim 1, wherein the polymer has less than 0.4 vinylene groups per 1000 carbons.

6. The ethylene polymer of claim 1, wherein the polymer has an Mw/Mn below 4.0.

7. The ethylene polymer of claim 1, wherein the polymer has a gel stiffness of more than 10,000 Pa*s$''$.

8. The ethylene polymer of claim 1, wherein the polymer has a relaxation exponent, n, between 0.35 and 0.85.

9. The ethylene polymer of claim 1, wherein the polymer has a gel stiffness of more than 10,000 Pa*s$''$ and a relaxation exponent, n, between 0.35 and 0.85.

10. The ethylene polymer of claim 1, wherein the polymer has a Tm (° C.) of 125° C. or more.

11. The ethylene polymer of claim 1, wherein the polymer has a Tm (° C.) of 130° C. or more.

12. The ethylene polymer of claim 1, wherein the polymer has an Mz of 150,000 g/mol or more.

13. The ethylene polymer of claim 1, wherein the polymer has 3 mol % or less of comonomer.

14. The ethylene polymer of claim 1, wherein the catalyst compound is a bridged bis-tetrahydroindenyl zirconocene catalyst compound.

* * * * *